United States Patent
Shipman et al.

(10) Patent No.: US 12,116,081 B2
(45) Date of Patent: *Oct. 15, 2024

(54) CONTROL ASSEMBLY FOR A WIRELESS ELECTROMECHANICAL BICYCLE SHIFTING SYSTEM

(71) Applicant: SRAM, LLC, Chicago, IL (US)

(72) Inventors: Christopher Shipman, Chicago, IL (US); Matthew C. Morris, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,126

(22) Filed: Aug. 8, 2023

(65) Prior Publication Data

US 2023/0382491 A1 Nov. 30, 2023

Related U.S. Application Data

(63) Continuation of application No. 18/066,622, filed on Dec. 15, 2022, now Pat. No. 11,845,512, which is a continuation of application No. 17/507,997, filed on Oct. 22, 2021, now Pat. No. 11,554,835, which is a continuation of application No. 16/192,115, filed on Nov. 15, 2018, now Pat. No. 11,180,219, which is a (Continued)

(51) Int. Cl.
*B62M 25/08* (2006.01)
*B62K 23/06* (2006.01)

(52) U.S. Cl.
CPC ............ *B62M 25/08* (2013.01); *B62K 23/06* (2013.01); *Y10T 74/2003* (2015.01)

(58) Field of Classification Search
CPC ..... B62M 25/08; B62K 23/06; Y10T 74/2003
See application file for complete search history.

(56) References Cited

U.S. PATENT DOCUMENTS

| | | | |
|---|---|---|---|
| 5,479,776 A | 1/1996 | Romano | |
| 6,073,730 A * | 6/2000 | Abe | B62K 23/06 340/432 |
| 7,947,914 B2 | 5/2011 | Takebayashi et al. | |

(Continued)

FOREIGN PATENT DOCUMENTS

| | | |
|---|---|---|
| CN | 1327930 | 12/2001 |
| CN | 101190706 | 6/2008 |

(Continued)

*Primary Examiner* — Daniel D Yabut

(57) ABSTRACT

A bicycle control assembly may be provided for operating an electromechanical gear shifting device. The control assembly includes a graspable housing mountable to the bicycle, a power supply connected to the control assembly disposed in the housing, a first operating member movably connected to the housing, and electronic componentry disposed on the first operating member. The electronic componentry may include an electrical switch, a controller in communication with the electrical switch and configured to generate a signal to change a shift position of the gear shifting device responsive to an input from the electrical switch, and an antenna in communication with the controller and configured to send the signal. The control assembly may also include a cable extending from the housing to the first operating member connecting the power supply and the electronic componentry.

16 Claims, 25 Drawing Sheets

Related U.S. Application Data continuation of application No. 14/244,983, filed on Apr. 4, 2014, now abandoned.

(56) References Cited

U.S. PATENT DOCUMENTS

| | | | |
|---|---|---|---|
| 8,035,046 B2 * | 10/2011 | Perini | B62K 23/02 |
| | | | 74/473.12 |
| 8,286,529 B2 | 10/2012 | Tetsuka | |
| 8,909,424 B2 | 12/2014 | Jordan et al. | |
| 8,931,365 B2 | 1/2015 | Fujii et al. | |
| 9,090,304 B2 | 7/2015 | Tetsuka | |
| 11,554,835 B2 * | 1/2023 | Shipman | B62K 23/06 |
| 2006/0070480 A1 | 4/2006 | Fujii | |
| 2007/0000343 A1 | 1/2007 | Ueno | |
| 2008/0210045 A1 * | 9/2008 | De Perini | B62K 23/06 |
| | | | 74/502.2 |
| 2009/0031841 A1 | 2/2009 | Tetsuka | |
| 2009/0315692 A1 | 12/2009 | Miki et al. | |
| 2010/0199798 A1 | 8/2010 | Uno | |
| 2012/0247264 A1 | 10/2012 | Tetsuka | |
| 2013/0192407 A1 | 8/2013 | Fujii et al. | |
| 2014/0015659 A1 | 1/2014 | Tetsuka | |
| 2014/0070930 A1 | 3/2014 | Hara | |
| 2014/0102237 A1 * | 4/2014 | Jordan | B62M 25/08 |
| | | | 74/473.12 |
| 2014/0290411 A1 | 10/2014 | Kuroda | |
| 2014/0352478 A1 | 12/2014 | Gao | |
| 2015/0259025 A1 | 9/2015 | Sala et al. | |
| 2017/0305488 A1 * | 10/2017 | Komatsu | B62L 3/02 |

FOREIGN PATENT DOCUMENTS

| | | |
|---|---|---|
| CN | 101219698 | 7/2008 |
| CN | 101254750 | 9/2008 |
| CN | 101607581 | 12/2009 |
| DE | 202011005403 | 8/2011 |
| EP | 0878383 | 11/1998 |
| EP | 1733963 | 12/2006 |
| EP | 1964763 | 9/2008 |
| EP | 2020371 | 2/2009 |
| EP | 2135804 | 12/2009 |
| FR | 2654698 | 5/1991 |
| FR | 8915093 | 5/1991 |
| TW | 1260294 | 8/2006 |
| TW | 1355350 | 1/2012 |

* cited by examiner

CONTROL ASSEMBLY FOR A WIRELESS ELECTROMECHANICAL BICYCLE SHIFTING SYSTEM

REFERENCE TO RELATED APPLICATIONS

This application is a continuation of U.S. patent application Ser. No. 18/066,622, filed Dec. 15, 2022, which is a continuation of U.S. patent application Ser. No. 17/507,997, filed Oct. 22, 2021, now U.S. Pat. No. 11,554,835, issued Jan. 17, 2023, which is a continuation of U.S. patent application Ser. No. 16/192,115, filed Nov. 15, 2018, now U.S. Pat. No. 11,180,219, issued Nov. 23, 2021, which is a continuation of U.S. patent application Ser. No. 14/244,983, filed Apr. 4, 2014, the contents of which are herein incorporated in their entirety

BACKGROUND OF THE INVENTION

This invention relates to bicycles and mechanisms for actuating bicycle gear shift devices and optionally also brake devices with a control assembly.

SUMMARY OF THE INVENTION

The invention provides, in one aspect, a bicycle control assembly for operating an electromechanical gear shifting device. The control assembly includes a graspable housing mountable to the bicycle, a power supply connected to the control assembly disposed in the housing, a first operating member movably connected to the housing, and electronic componentry disposed on the first operating member. The electronic componentry may include an electrical switch, a controller in communication with the electrical switch and configured to generate a signal to change a shift position of the gear shifting device responsive to an input from the electrical switch, and an antenna in communication with the controller and configured to send the signal. The control assembly may also include a cable extending from the housing to the first operating member connecting the power supply and the electronic componentry.

Other aspects of the invention provide a power supply, which may be on the housing. The power supply may be a battery housed within the housing. The battery may be oriented substantially parallel to a centerline of the housing. The first operating member may be a shift lever assembly. The shift lever assembly may include a shift lever including a distal portion and a proximal portion, the proximal portion movably supported by the housing. The antenna may be on the distal portion of the shift lever. The distal portion may include an internal compartment and the antenna may be housed within the internal compartment. The controller may be housed within the internal compartment. The bicycle control assembly may further comprise a communications module in communication with the controller and the antenna and housed with the internal compartment. The electrical switch may be on the distal end of the shift lever. The bicycle control assembly may further include a second electrical switch in communication with the controller to change one or more of non-shifting operations of the controller and non-shifting operations of the electromechanical gear shifting device. The non-shifting operations may include one or more of pairing operations of the control assembly to the electromechanical gear shifting device and trim operations of the electromechanical gear shifting device. The bicycle control assembly may further include a second operating member, wherein the second operating member may be a brake lever. The shift lever assembly may be pivotally connected to the housing to move relative to the brake lever. The brake lever may be pivotally connected to the housing on a brake lever pivot. The shift lever assembly may be movably disposed on a shift lever pivot that may be substantially perpendicular to the brake lever pivot. The bicycle control assembly may further include a shift pivot bracket that includes the shift lever pivot, the shift pivot bracket having an opening through which the brake lever pivot passes. The shift lever pivot may be positioned above the brake lever pivot. The first operating member may be connected to the second operating member.

These and other features and advantages of the present invention will be more fully understood from the following description of one or more embodiments of the invention, taken together with the accompanying drawings.

DETAILED DESCRIPTION OF THE PREFERRED EMBODIMENTS

Figure 1:
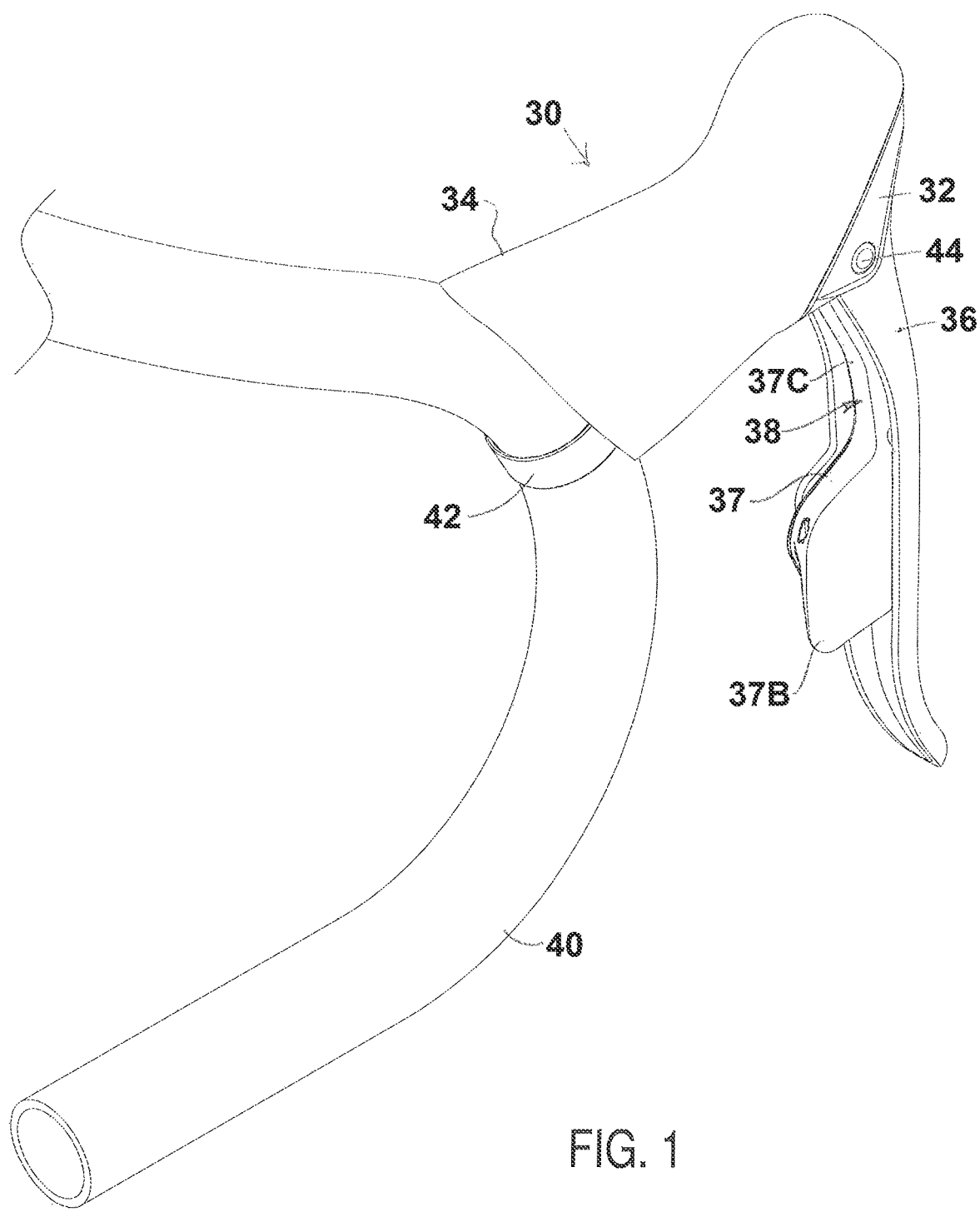
FIG. 1 is a rear perspective view of a control assembly attached to a handlebar.
Figure 2:
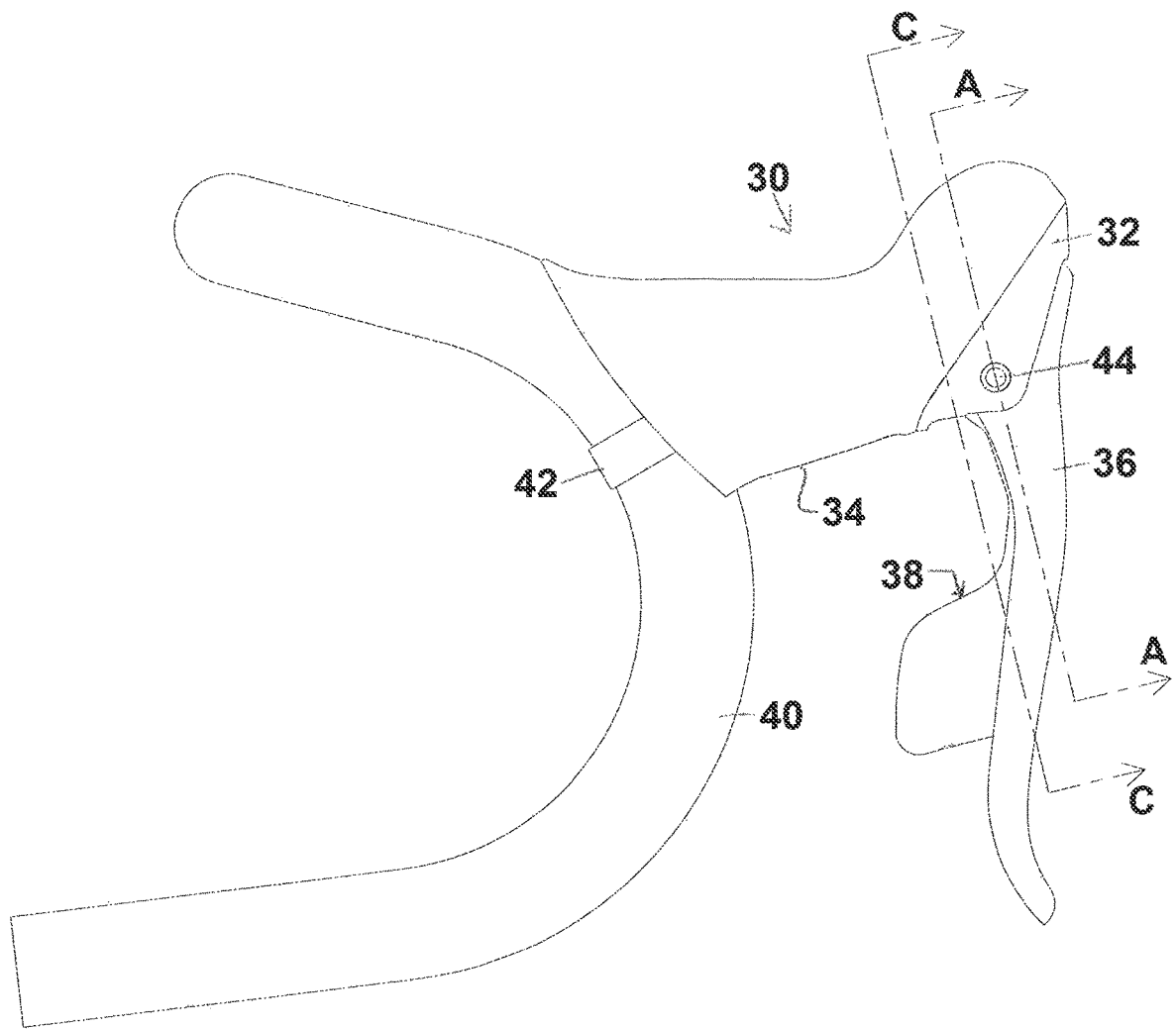
FIG. 2 is an outer side view of a control assembly attached to a handlebar.
Figure 3:
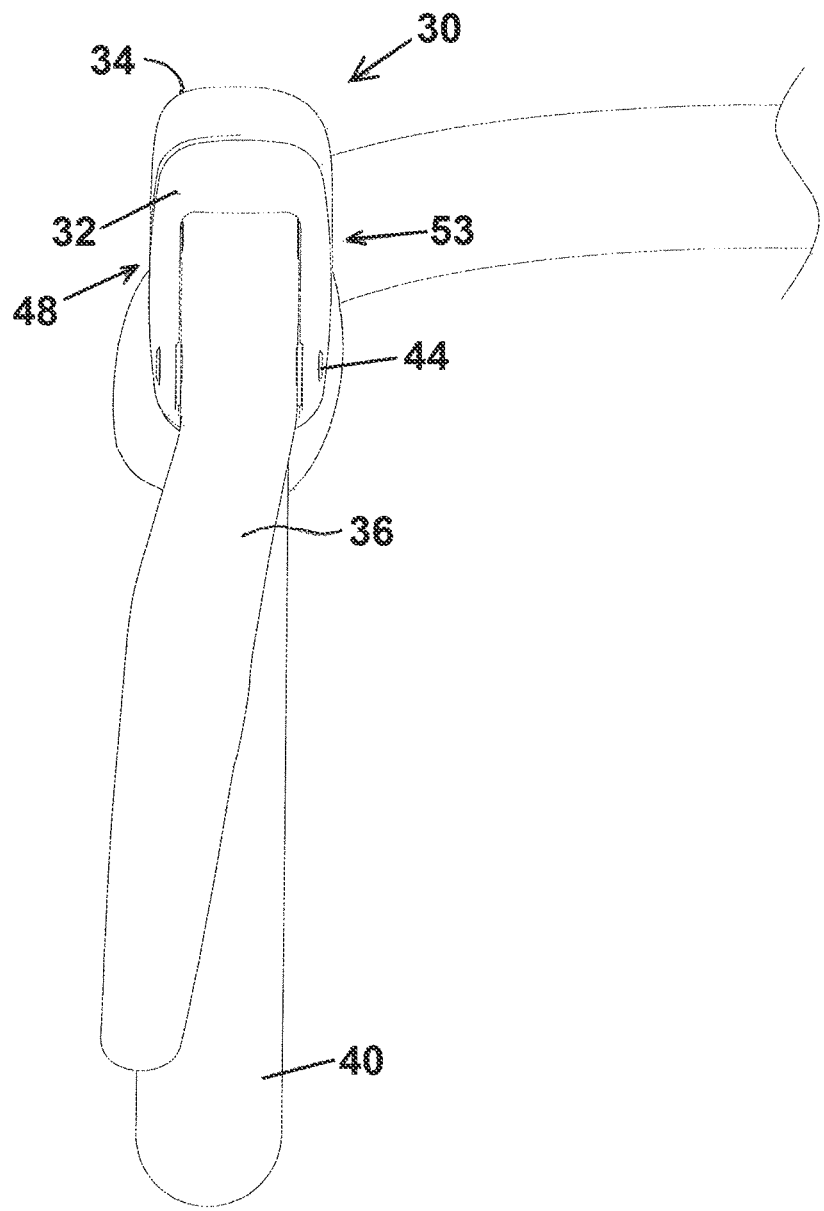
FIG. 3 is a front view of a control assembly attached to a handlebar.
Figure 4:
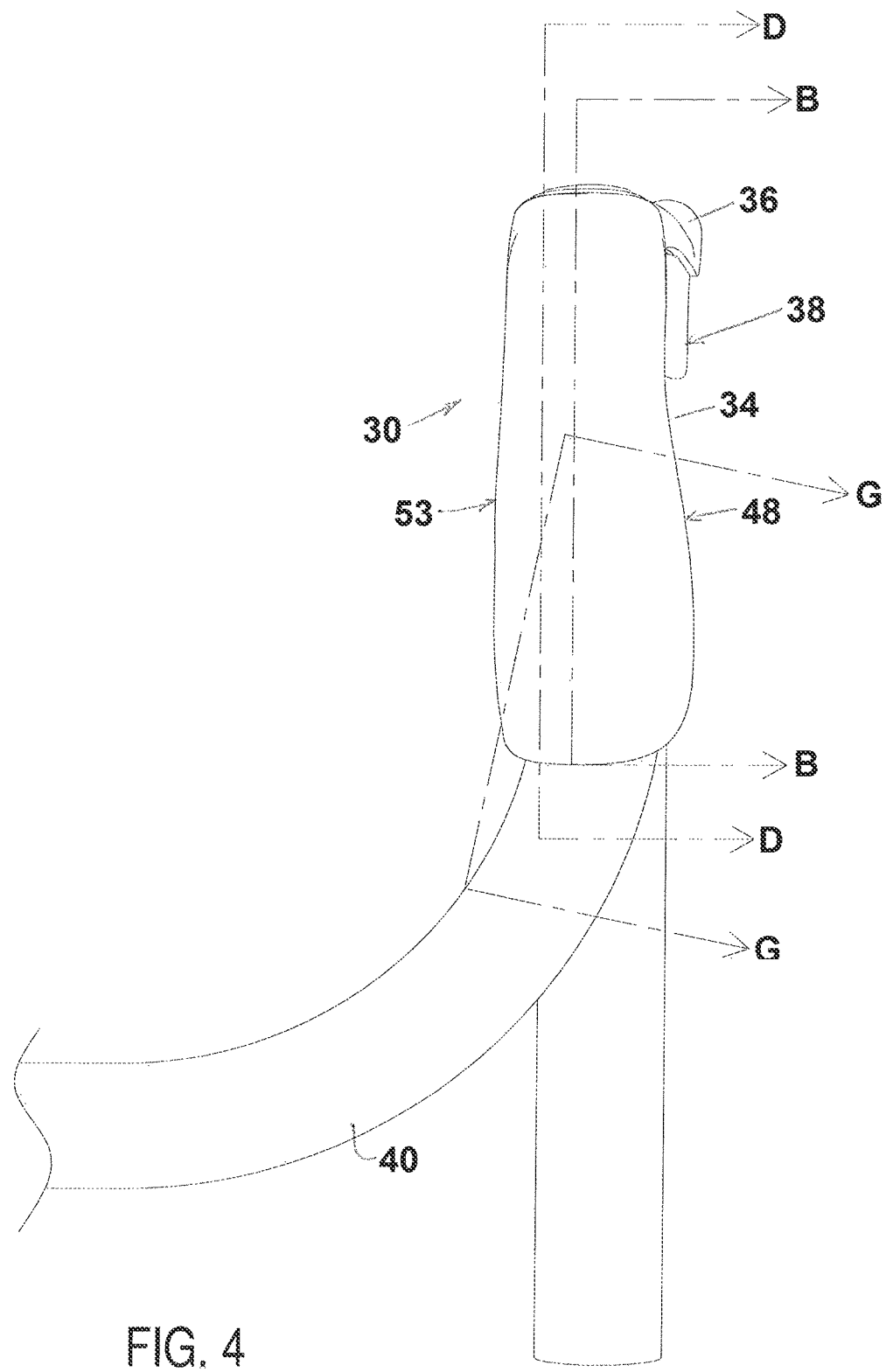
FIG. 4 is a top view of a control assembly attached to a handlebar.

Embodiments of the invention will herein be described with reference to the drawings. It will be understood that the drawings and descriptions set out herein are provided for illustration only and do not limit the invention as defined by the claims appended hereto and any and all their equivalents. For example, the terms "first" and "second," "front" and "rear," or "left" and "right" are used for the sake of clarity and not as terms of limitation. Moreover, the terms refer to bicycle mechanisms conventionally mounted to a bicycle and with the bicycle oriented and used in a standard fashion unless otherwise indicated.

FIGS. 1-4 are various exterior views of a bicycle control assembly 30 according to the invention. The control assembly 30 is mountable to a handlebar 40 with a known type of clamp 42, for example, including a band positioned about the handlebar. Typically, a bicycle uses a pair of control assemblies 30, one for each side of the handlebar, as is well known. It will also be understood that together, the pair of assemblies may be configured to operate a pair of electro-mechanical derailleurs. Similarly, the assemblies 30 may also be configured to operate brake devices.

Control assembly 30 includes a housing 32, which may be covered with a cover 34. The housing 32 is shaped and sized to be grasped by a hand of a user. The housing 32 and cover 34 serves as a grip or graspable portion. The housing 32 may be of any suitable material, for example, metal, plastic and/or composite materials. The housing 32 should be constructed to carry, house and/or support various mechanisms as will be explained in detail herein. The cover 34 may be made of any suitable material, such as natural and/or synthetic elastomeric materials and may be designed to present a comfortable interface with the user and reduce the tendency to become detached or moved from its position on the housing 32. One such material is a thermoplastic elastomer (TPE) such as Santoprene™. The cover 34 may be configured to be removably attached to and held in position on the housing 32 using known methods, one of which will be described in more detail below.

A brake lever 36 is pivotally or movably attached to the housing 32, for example, at or near the leading or front part of the housing such that the brake lever is spaced apart from the handlebar 40 and can pivot generally forward and backward. The brake lever 36 may be made of any suitable material such as metal, plastic or composite materials. The brake lever 36 may be attached to the housing 32 by way of a pivot 44, which may in the form of a pivot, pin, rod or shaft, for example. In one embodiment, the brake lever 36 is considered a first operating mechanism, and may be the sole operating mechanism (see FIG. 24).

As will be shown in more detail hereinbelow (see FIGS. 6 and 7) some or all of brake lever 36 may be generally U-shaped or channel-shaped and the shift lever assembly 38 may be positioned completely or partially within the interior or channel of the U-shape. This provides some rigidity to the structure and may provide protection for components disposed within the channel. The shape of the brake lever 36 may receive, at least in part, a shift lever assembly 38 and may provide some further features of the invention as will be shown below.

A shift lever assembly 38 may also be pivotally or movably attached to the housing 32. The shift lever assembly 38 may be positioned behind the brake lever 36, i.e., between the brake lever and the handlebar 40. The shift lever assembly 38 may be made of plastic or composite materials, for example. In the present embodiment, the shift lever assembly 38 is made, at least in part, of material that does not significantly inhibit the passage therethrough of wirelessly transmitted signals.

One of the brake lever 36 and the shift lever assembly 38 may be considered a first operating member which is movable relative to the housing and the other of the brake lever 36 and the shift lever assembly 38 may be considered an optional second operating member. In one alternative embodiment, the brake lever 36 and parts of the shift lever assembly 38 are combined into a unitary first operating member.

Figure 5:
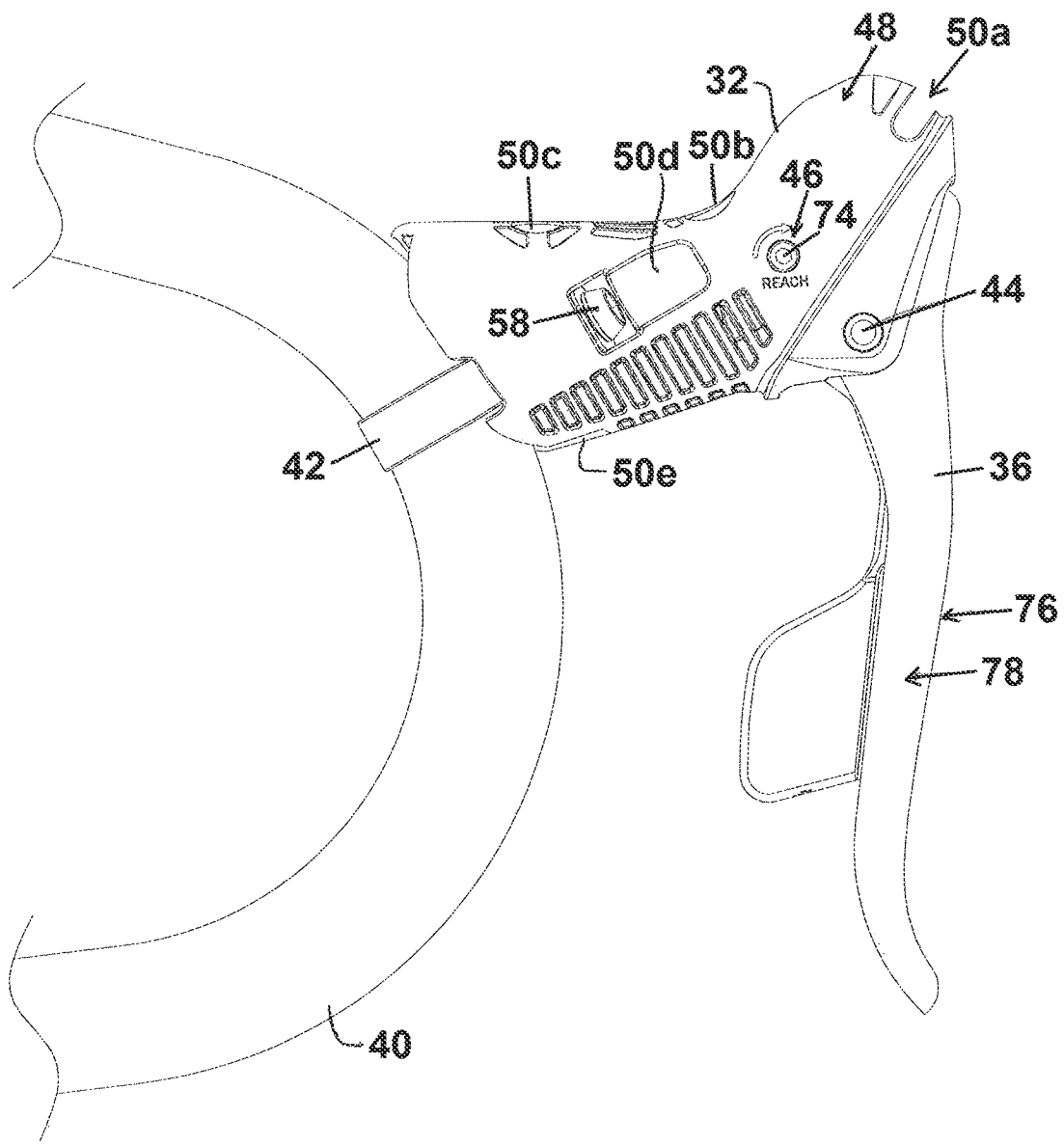
FIG. 5 is the control assembly of FIG. 2 with the cover removed.
Figure 6:
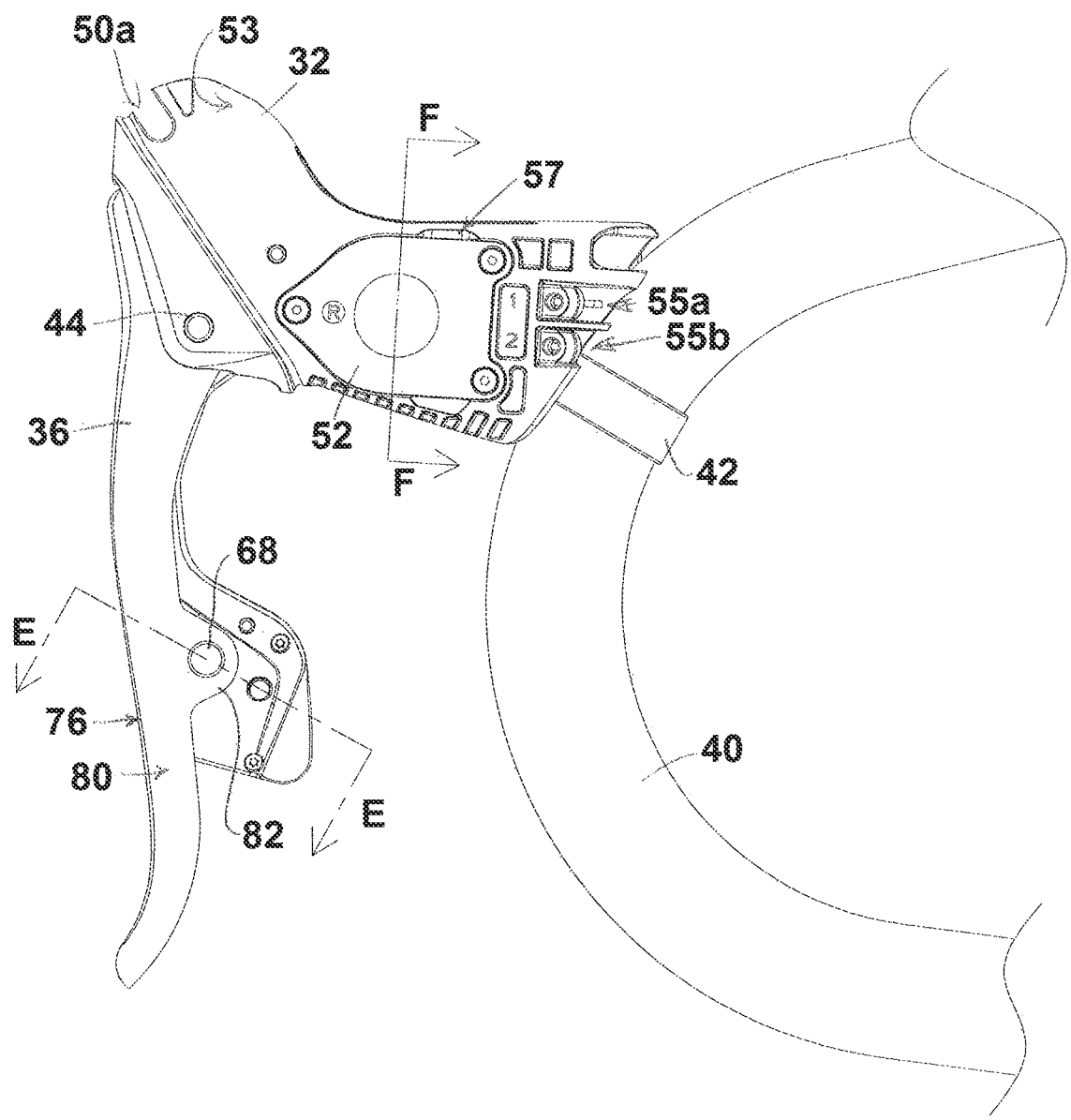
FIG. 6 is an inner side view of the control assembly of FIG. 5.

FIGS. 5 and 6 shows housing 32 of control assembly 30 with the cover 34 removed. The outboard side 48 of this embodiment is best shown in FIG. 5 and the inboard side 53 is best shown in FIG. 6. It will be understood that outboard side 48 is a direction facing laterally away from a centerline of the bicycle when the control assembly 30 is mounted for use and the inboard side 53 faces the centerline.

A brake lever pivot 44 may be held in housing 32 by two spaced brake lever pivot holes 54 formed in a spaced apart configuration (only one hole is shown). The brake lever 36 is pivotally mounted to the body 32 on the brake lever pivot 44. The pivot 44 may be in the form of a pin or shaft, for example. The brake lever 36 may have a generally "U" or channel shape including a front or forward-oriented side 76 extending between spaced outer and inner walls 78, 80. The channel shape of brake 36 provides stiffness to the lever, is lightweight, and provides some protection to the shift lever assembly 38 or components residing within. A tool receptacle 74 of a reach adjust mechanism 46 is provided, which may be made to be accessible from the outboard side 48, the details of which will be discussed hereinbelow.

The housing 30 may include one or more cover catch 50, which is a structure that functions to hold the cover 34 on the control assembly 32. A concavity may be formed in the housing 32 at or near an upper and forward portion thereof to form a first cover catch 50a. The first cover catch 50a may be in the shape of a transverse slot. The housing 32 may have second and third cover catches 50b, 50c, in the form of pockets, hollows, bores or the like formed on the spine or upper surface of the body. A fourth cover catch 50d may be formed as a clearance (e.g., an angled pocket) for the bolt 58 that adjusts the clamp 42. The housing 32 may have a fifth 50e cover catch in the form of a pocket, hollow, bore or the like formed in the under part of the body. The cover catches 50a-e are shaped and sized to interact with a matching or complementary part of the cover 34 to assist in the retention of the cover on the housing 32. The number and position of cover catches 50 will be determined by a number of factors, including the materials used, the arrangement of other elements of the control assembly and other design considerations.

Turning to FIG. 6, an internal compartment 57 of the housing 32 is sized and shaped to house a battery or other form of power supply 130 and optional other components, mechanisms and the like. The power supply 130 may be a coin cell. The compartment 57 may be accessed through a housing cover 52, which may be held in place with screws or other fasteners.

One embodiment of the invention contemplates the formation of a brake lever protrusion 68 attached to, formed on, or otherwise provided on the brake lever 36. The brake lever protrusion 68 may be in the form of a post or boss or cylinder or the like, that is provided on an inner wall 80 of brake lever 36 and alternatively on a side wall, tab or extension 82 of the inner wall. The protrusion 68 extends toward the interior concavity of the U-shape (see FIG. 14). The protrusion 68 interacts with elements of the shift lever assembly 38, as will be explained more fully below. Alternatively, the protrusion 68 may hold an electrical switch 120 for initiating a gear shift (see FIG. 24).

Optional accessory connections 55a, 55b may be formed in the inboard side 53 of the housing 32 and permit external accessories to be electrically connected to electrical power sources and/or electrical circuitry and the like located on or in the control assembly 30. One example of such an accessory is a remote electrical switch, such as a dome switch (not shown). The connections 55 may also be ports for connecting to cable-operated or hydraulic brakes.

Figure 7:
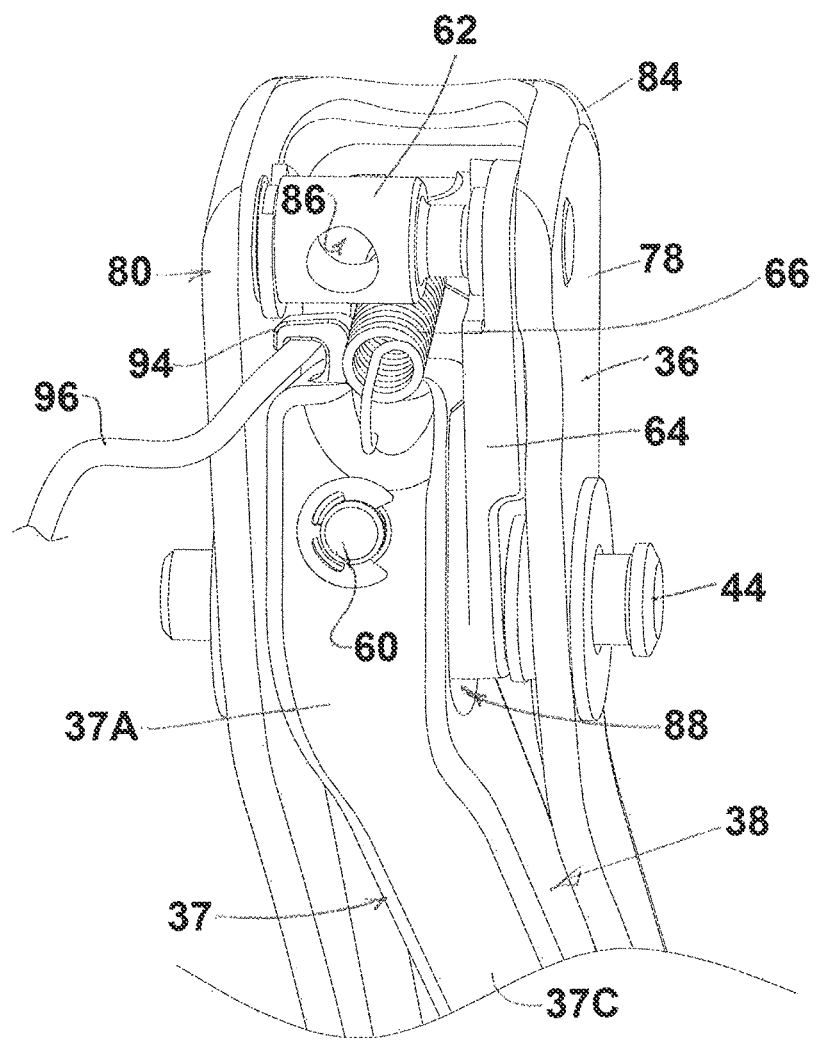
FIG. 7 is an overview of the brake pivot and shift lever pivot (with parts removed for clarity)
Figure 8:
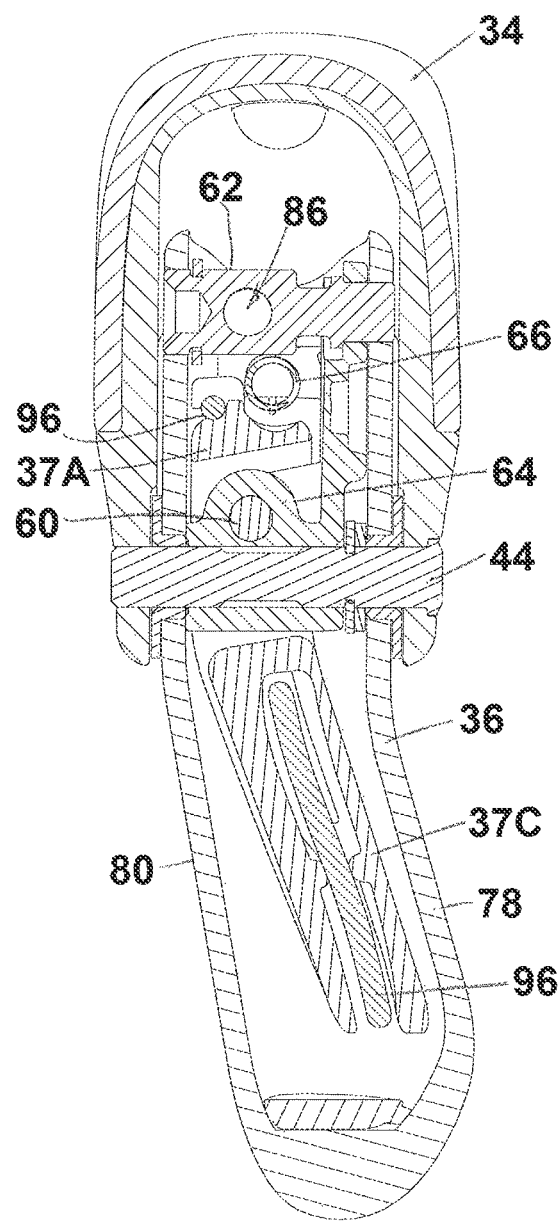
FIG. 8 is a sectional view along A-A of FIG. 2 showing the brake pivot.

FIGS. 7 and 8 show some of the internal structure of the control assembly 30 as it relates to the brake lever 36. At or near the top end 84 of the brake lever 36 is a brake cable head holder 62. The holder 62 may be an element oriented transversely across the width of the brake lever 36 and rotatably connected to the inner wall 80 at one end and the outer wall 78 at the opposite end of the holder. The holder 62 includes a holder opening 86 that is sized and shaped to permit a brake cable (not shown) to be received therethrough but retain the head or nipple of the cable (not shown) as is well known.

The brake lever 36 is pivotally disposed on the transversely-aligned brake lever pivot 44 and the shift lever assembly 38 is movably disposed on a shift lever pivot 60. The shift lever pivot 60 may be aligned in a direction substantially perpendicular to the brake lever pivot 44, i.e., within about 25 degrees of perpendicular.

The orientation of the shift lever pivot 60 permits the shift lever assembly 38 to move in a direction that is substantially aligned with the axis of the brake lever pivot 44. In other words, the shift lever assembly 38 is mounted to move inwardly and outwardly, (i.e., inboard and outboard) for example, toward the inner wall 80 from a rest position adjacent the outer wall 78 of the brake lever 36 and back.

The shift lever assembly 38 includes a shift lever 37, which has a proximal end 37A directly or indirectly pivotally attached to the housing 32, a distal or paddle end 37B opposite the proximal end (see FIG. 9) and an elongate arm 37C connecting the proximal and distal ends. The arm 37C may be U-shaped in a similar manner as that of the brake lever 36 or a hollow rectangular member, for example (see FIG. 9).

The shift lever assembly 38 may also have an opening 88 that is located to accommodate the passage therethrough of the brake lever pivot 44 and permit the shift lever assembly to be moved about the shift lever pivot 60 without interference from the brake lever pivot.

A shift pivot bracket 64 has a portion that is arranged about the brake lever pivot 44 (see also FIGS. 8, 9 and 10) and resides in part in the opening 88 of the shift lever assembly 38. The shift pivot bracket 64 extends away from the brake lever pivot 44 to receive the shift lever pivot 60. The shift pivot bracket 64 may extend upwardly from the area of the brake lever pivot 44 to connect to the brake cable head holder 62. The shift pivot bracket 64 connects the brake lever pivot 44 to the brake cable head holder 62 to cause the shift lever assembly 38 to move with the brake lever 36 in the fore and aft direction when the brake lever is actuated while permitting the shift lever assembly to move laterally relative to the brake lever enabling a shift operation independent from a brake operation.

A return spring 66 connects directly or indirectly to housing 32 to bias the brake lever 36 to a rest position. The return spring 60 may connect to a retainer feature 90 of the shift pivot bracket 64 at one end and a shaft 70 of the reach adjust mechanism 46. The return spring 66 biases the brake lever 36 and shift lever assembly 38 into a rest position with the brake lever in a non-actuated or home state.

A guide 94 may be provided on one of the shift lever 37 and the shift pivot bracket 64. The guide 94 is positioned, shaped and sized to receive an electrical cable 96. The electrical cable 96 electrically connects electrical components that may be located in the distal or paddle end 37B of the shift lever 37 and electrical components that may be located in the housing 32. The structure and function of the various electrical components will be explained hereinbelow.

Figure 9:
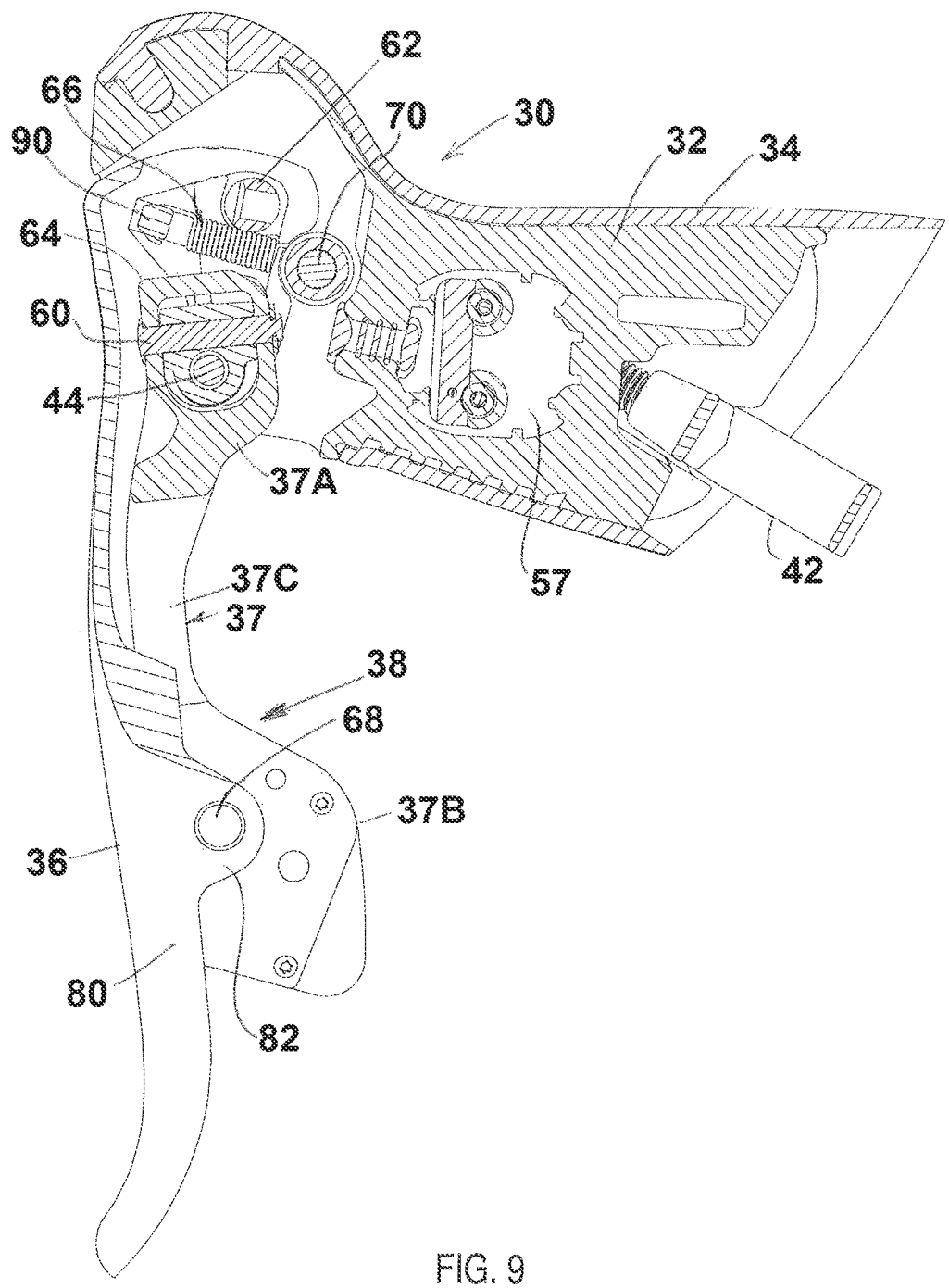
FIG. 9 is a sectional view along B-B of FIG. 4 showing the shift lever pivot.

FIG. 8 further shows that the cable 96 extends along the length of the shift lever arm 37C. FIGS. 8 and 9 show that the rotatable connection of the brake cable head holder 62 to the brake lever 36 may be at or near the top end of the brake lever. The return spring 66 may pass between the brake cable head holder 62 and the shift lever proximal end 37A. The shift lever pivot 60 may be positioned above the brake lever pivot 44.

Figure 10:
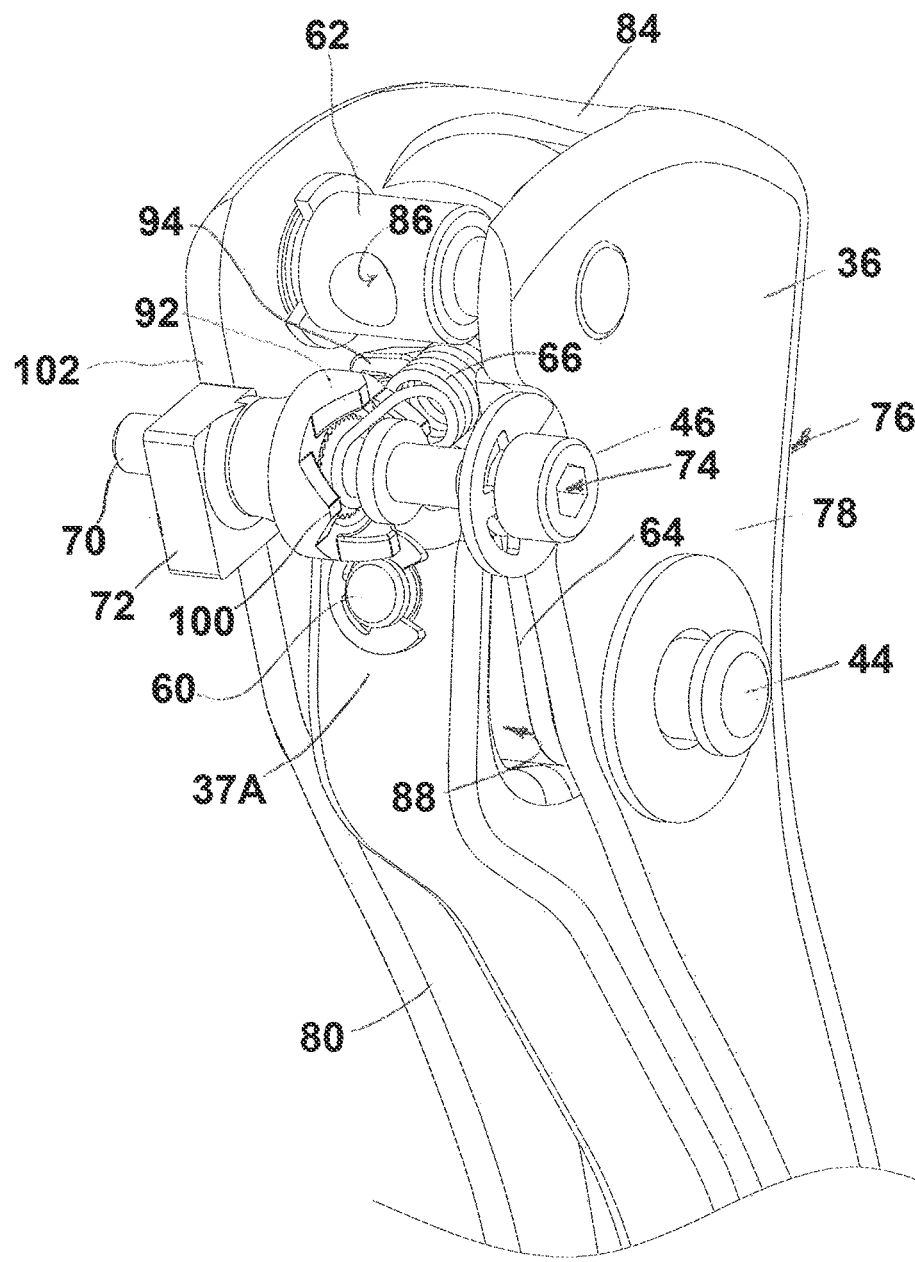
FIG. 10 is an cutaway view of a reach adjust mechanism (with parts removed for clarity)
Figure 11:
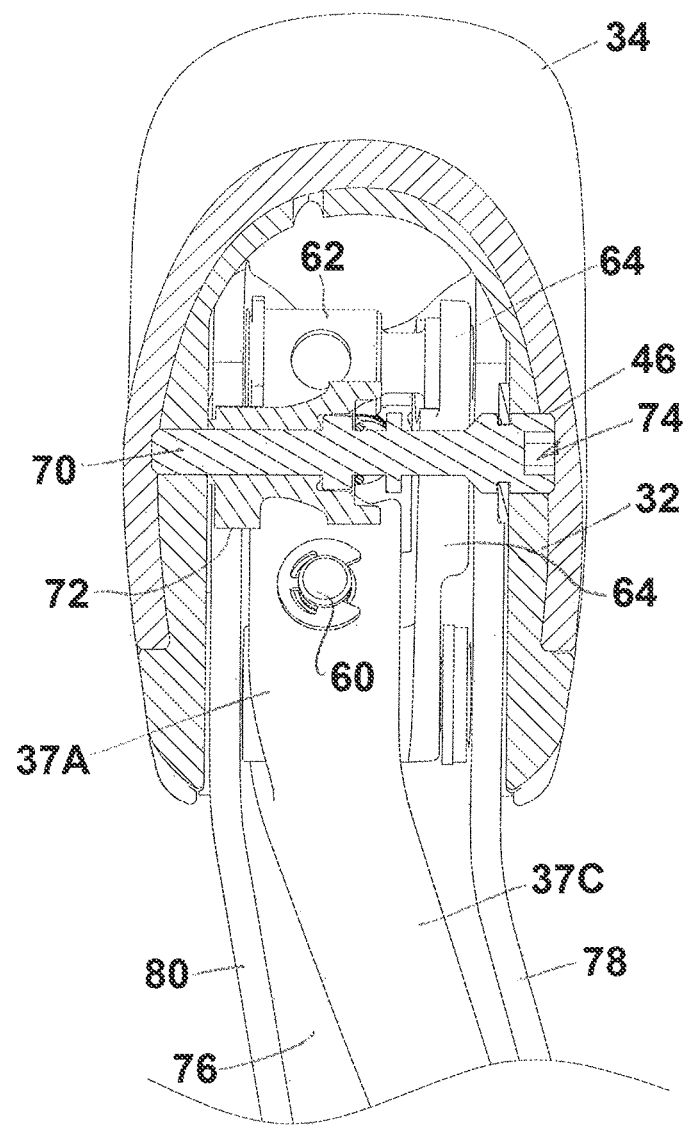
FIG. 11 is a sectional view along C-C of FIG. 2 of a reach adjust mechanism.
Figure 12:
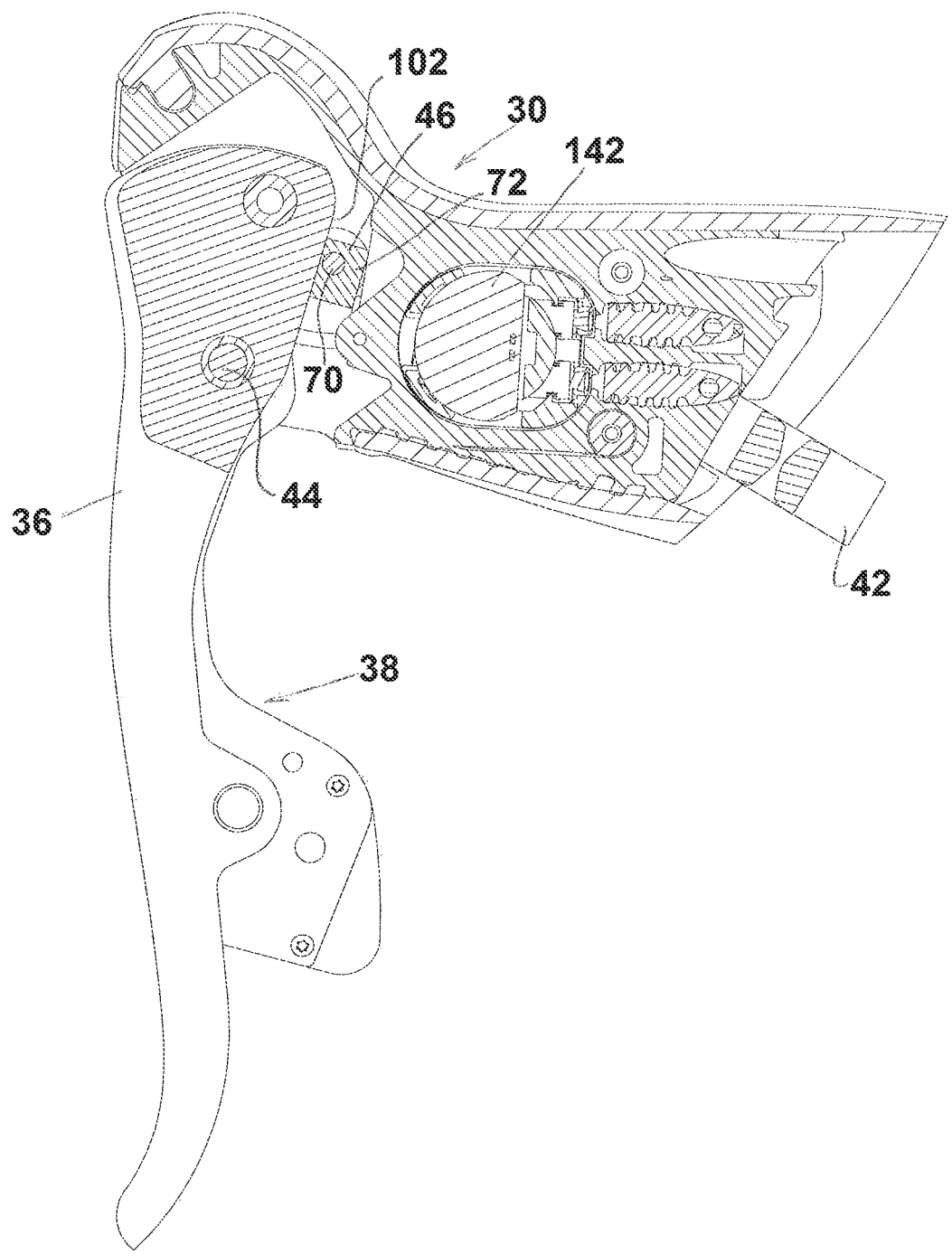
FIG. 12 is a sectional view along D-D of FIG. 4 of a reach adjust cam.
Figure 13:
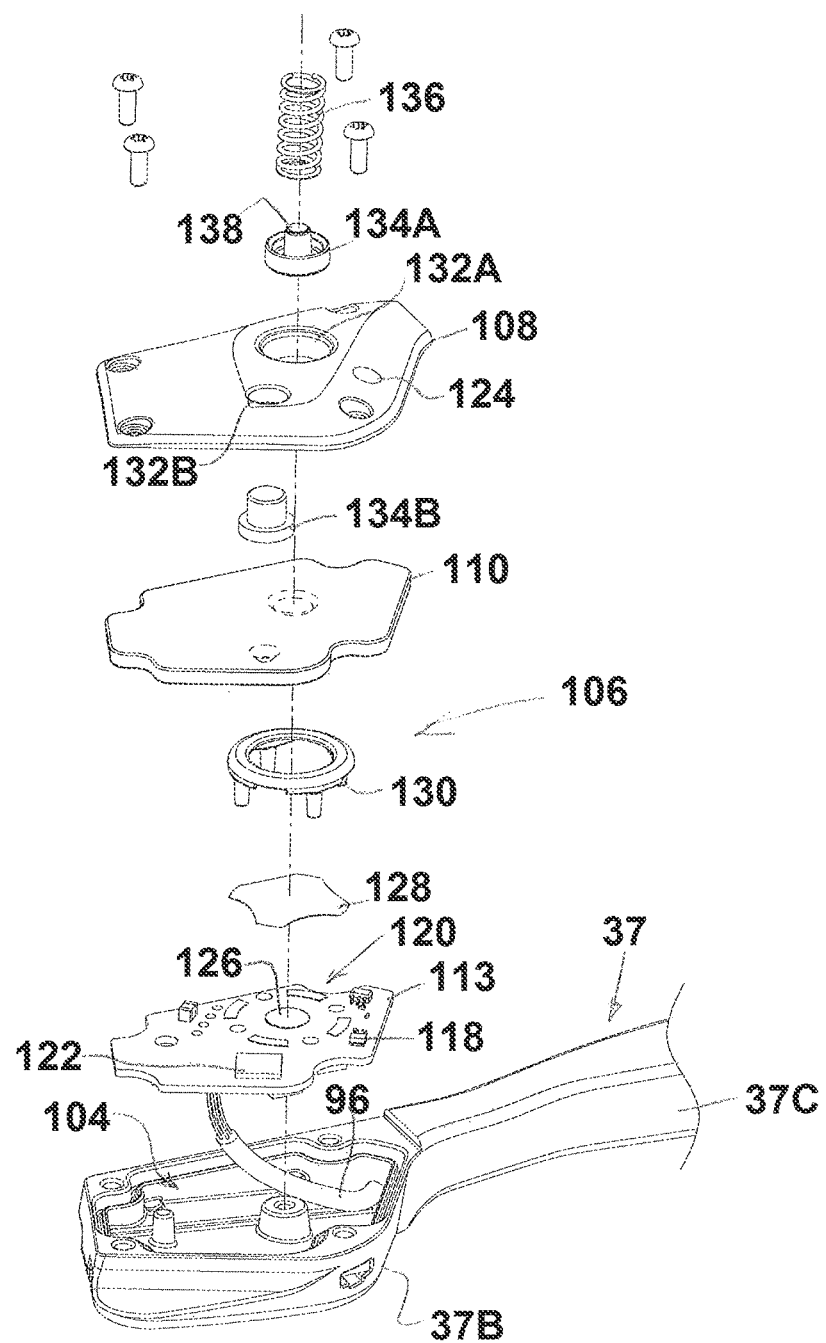
FIG. 13 is an exploded view of the shift lever assembly.

FIGS. 10, 11 and 12 show the reach adjust mechanism 46. The reach adjust mechanism 46 includes a shaft 70 that is laterally disposed in the housing 32 (FIG. 11). The shaft 70 includes a cam 72. An end of the shaft 70 includes a tool receptacle 74 for rotating the shaft and cam 72. An example is shown of a detent mechanism 92 to retain the cam 72 in a desired orientation. The detent mechanism 92 includes lobes 100 that interact, in this example, with the return spring 66 until rotated with sufficient force exerted by a tool in the tool receptacle 74 to overcome the interaction of the lobes and spring. The reach adjust mechanism 46 may include a plurality of positions offering several cam faces or lobes 72, e.g., four lobes, with different spacing of the brake lever 36 relative to the shaft 70 as a function determined by the particular cam face employed. The cam 72 is positioned adjacent a face 102 of one of the outer and inner walls 78, 80 of the brake lever 36 such that one of the faces of the cam contacts the face. Other mechanisms to accomplish the same task may be used.

FIGS. 13-16 show an example of some of the electronic componentry 106 for operation of the assembly 30. The electronic componentry 106 may be housed within the distal end 37B of the shift lever 37. In alternative embodiments, some of the electronic componentry 106 may be housed on and/or within the brake lever 36 or the housing 32.

The distal end 37B may be a widened part of the shift lever 37 to provide convenient and secure interaction with a user. The distal end 37B has one or more internal compartments 104 for housing the electronic componentry 106. The internal compartment 104 is closed by a compartment cover 108. To exclude water and other contaminants from entry into the internal compartment 104, a seal 110 may be interposed between the compartment and the cover 108. The seal 110 may be a rubber seal member or any suitable material that satisfactorily seals the compartment from contaminants. In one example, the seal 110 is transparent or includes an area of the seal material that permits light to pass through from a LED component 118, or the like, of the electronic componentry 106, for example.

Figure 17:
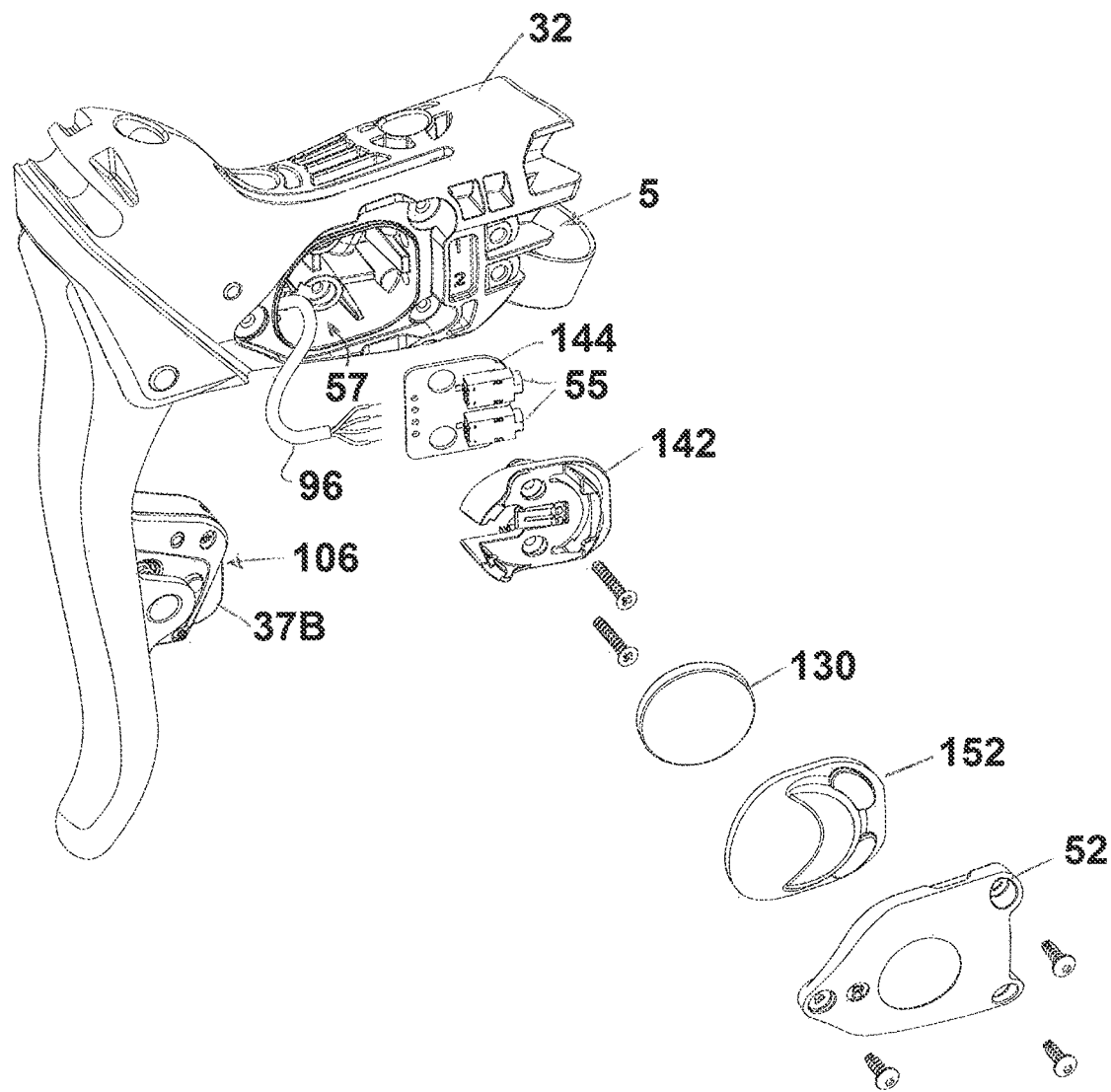
FIG. 17 is an exploded view showing the battery holder assembly and associated parts (cover removed)
Figure 18:
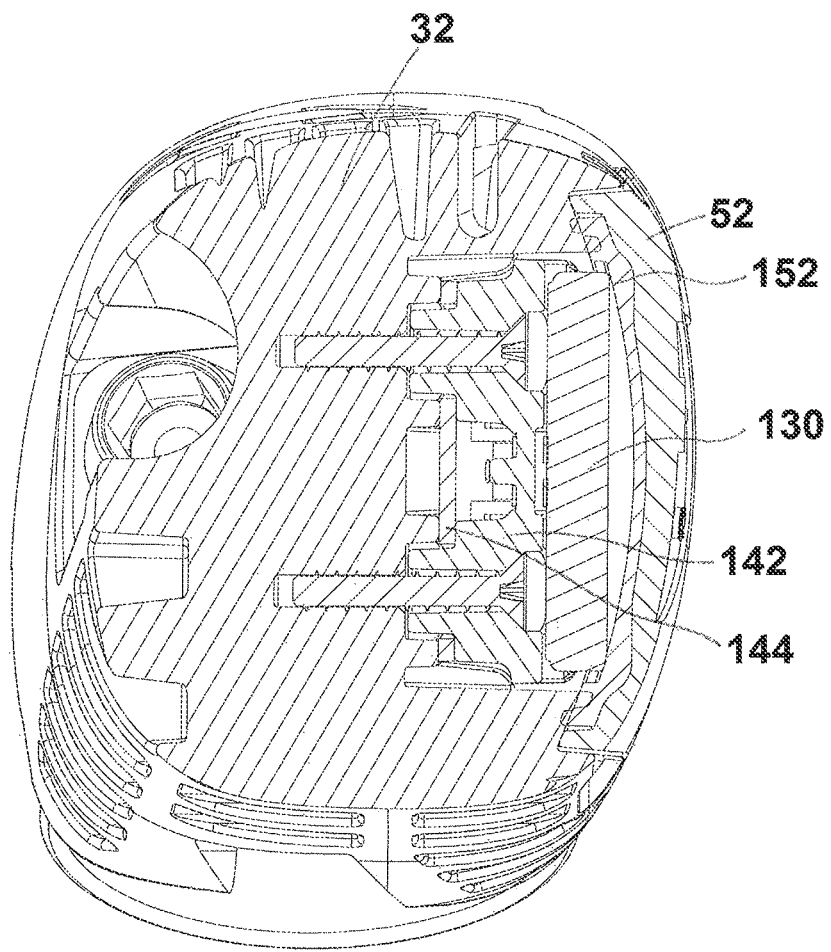
FIG. 18 is a sectional view along F-F of FIG. 6 of the shifter assembly taken through the mounting screws of the battery holder assembly (handlebar not shown)
Figure 19:
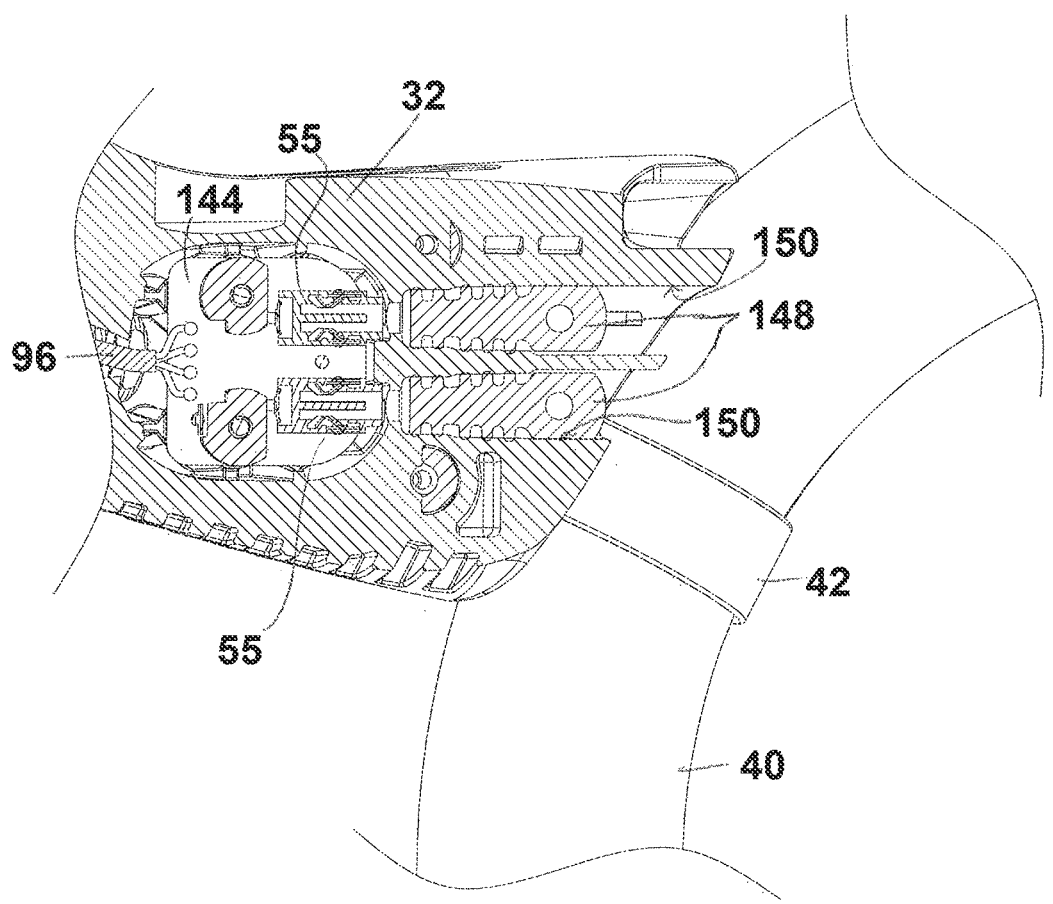
FIG. 19 is a sectional view along G-G of FIG. 4 of the auxiliary connections and dummy plugs.

The cable 96 is electrically connected to the electronic componentry 106 and extends along the interior of the shift lever arm 37C from the housing 32. The cable 96 may electrically connect the power supply 130, e.g., a battery, positioned in the housing 32 (see FIGS. 16 and 17) and optional accessory connections 55 with the electronic componentry 106.

The electronic componentry 106 may be mounted upon or connected to a PC board 113 or the like. The PC board 113 may include a communication module 112 to generate and transmit signals for wireless transmission in the form of electromagnetic radiation (EMR), e.g., radio waves. Optionally, the communication module 112 may also receive signals, which may be in the form of EMR. The communications module 112 includes or is a transmitter or a transceiver, for example.

The PC board 113 may include an antenna 114 in operative connection with the communication module 112 to send and optionally also receive EMR. The antenna 114 is any device designed to transmit and/or receive electromagnetic (e.g. TV or radio) waves.

It is one aspect of the invention that the antenna 114 is located in a position or part of the control assembly 30 where it will be able to send signals without significant interference from the structure of the assembly and/or from a user's hand. The invention therefore contemplates, in one embodiment, the antenna 114 positioned, at least in part, in a portion of the control assembly 30 that is separate or remote or spaced from the housing 32. The position of the antenna 114 may be the brake lever 36 or shift lever 37, for example.

The control assembly 30 includes a controller 116, which may be positioned on the PC board 113. The controller 116 is operatively connected to the communication module 112 to perform electronic operations related to one or more of shifting, pairing, derailleur trim operations, power management and so on.

An example of a controller 116, suitable and configurable for the objectives set out herein, is an Atmel ATmega324PA microcontroller with an internal eeprom memory. An example of a communication module 112, suitable and configurable for the objectives set out herein, is an Atmel AT86RF231 2.4 GHz transceiver utilizing AES encryption and DSS spread spectrum technology supporting 16 channels and the IEEE 802.15.4 communication protocol. Other suitable microcontrollers 116 and communications modules 112 are contemplated. Also, ancillary electrical and/or electronic devices may be used as is well known in the art, to enable the functioning of the controller 116 and communications module 112 and related components.

The control assembly 30 may include one or more LED 118, which may be positioned on the PC board 113. The LED 118 conveys status of the electronic componentry 106 and the one or more electrical switches 120, 122. Light emitted by the LED 118 may be viewable, for example, through the seal 110 and an opening or non-opaque area 124 that is provided in the cover 108.

The electrical switches 120, 122, when actuated, may cause operations to be carried out by the controller 116. The operations carried out by the controller 116 may be related to communication, derailleur pairing, trim and/or shift operations, for example, and may generate signals to initiate or elicit an action and/or response from various mechanisms of a bicycle such as electromechanical derailleurs (see FIG. 23).

A first electrical switch 120 includes a contact 126, which may be disposed on the PC board 113, an electrical dome switch element 128, or the like, positioned to contact the contact when depressed and a retainer 130 connected to the PC board to maintain alignment of the electrical dome switch element with the contact. While other types of electrical switches may be used, dome switches like the one illustrated are robust, reliable and provides a desired amount of feedback to the user.

The first electrical switch 120 may be used for an operation of the control assembly 30 that will be performed more frequently and potentially forcefully, such as the initiation of a shift operation.

A second, optional, electrical switch 122 may also be a dome switch. The second electrical switch may be a smaller and more self-contained switch that is intended to be used less frequently than the first switch 120. For example, the second electrical switch 122 could be used for operations related to pairing a particular control assembly with one or more electromechanical derailleur (FIG. 23) or derailleur trim operations.

In the example shown herein, the electronic componentry 106 is disposed on the PC board 113, which is positioned and fixed in place in the compartment 104. The seal 110 overlies the PC board 113 and seals to the compartment 104 of the distal end 37B and the cover 108 when the cover is affixed to the shift lever distal end. In this example, the first and second electrical switches 120, 122 may be actuated through the seal 110 from the outside thereof. The cover 108 includes one or more opening 132 A, B, each of which includes a respective button actuator 134 A, B disposed therein. The button actuators 134 A, B operate through the material of the seal 110. In this manner, the integrity of the seal 110 is not compromised. Also, an actuator spring 136 may be provided on actuator 134A. The actuator spring 136 may be held on the actuator 134A by a projection 138 that may be sized and shaped to retain the spring in alignment and/or engagement with the actuator. When the actuator spring 136 is sufficiently compressed, it urges the actuator 134A toward the seal 110 and electrical dome switch element 128, causing the dome switch element to close with the shift switch 126 and actuate the electrical switch 120.

Figure 14:
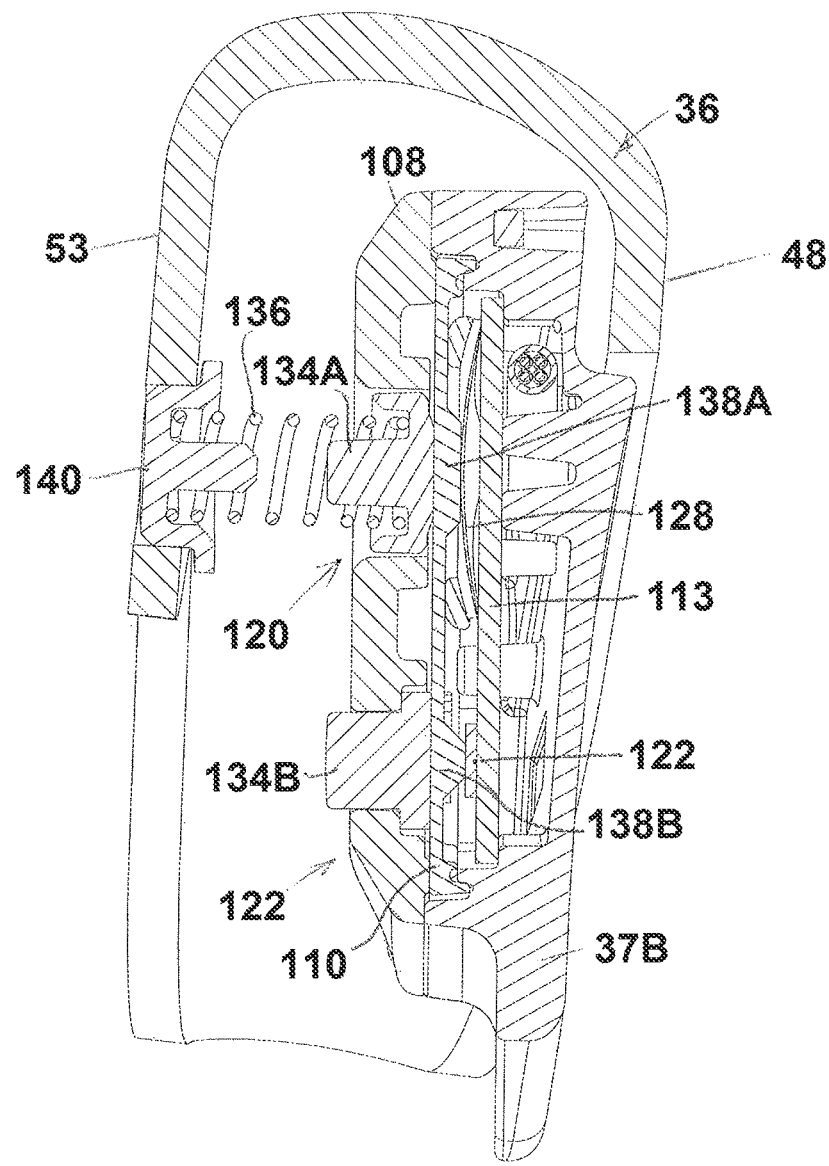
FIG. 14 is a sectional view along E-E of FIG. 6 of the electrical shift (dome) switch and electrical modifier button or switch.
Figure 15:
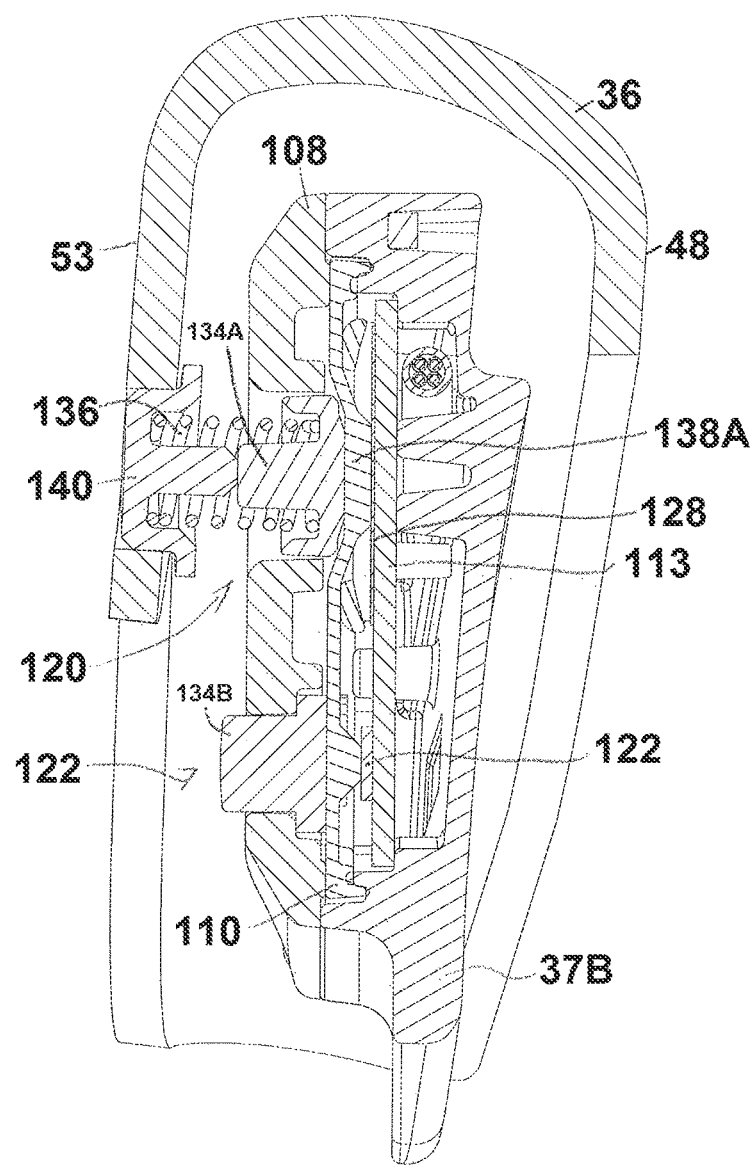
FIG. 15 is a sectional view along E-E of FIG. 6 of the electrical shift (dome) switch and electrical modifier button or switch but with the shift lever shown in the actuated position (i.e. dome is actuated)
Figure 16:
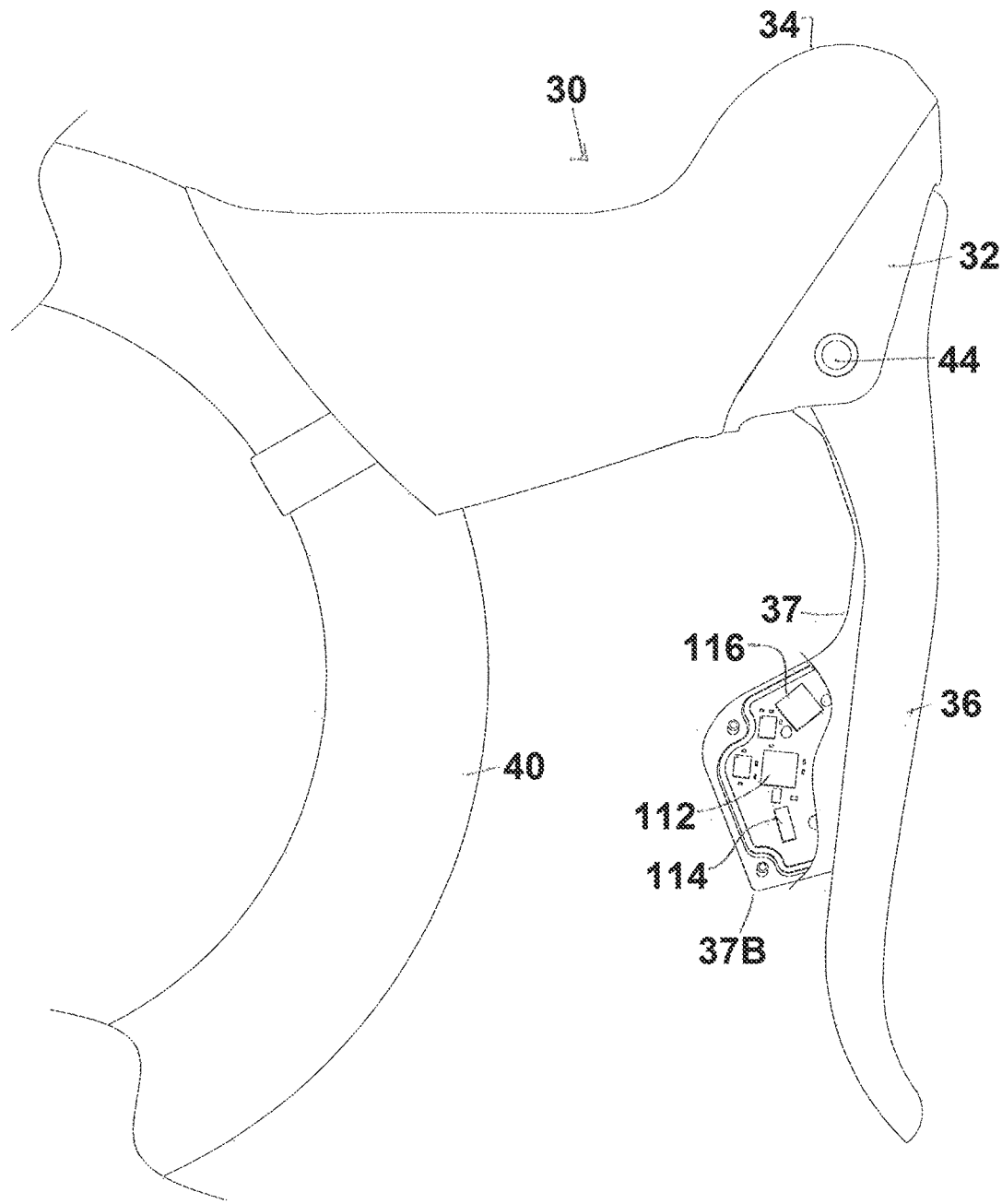
FIG. 16 is a cutaway view of FIG. 2 showing the communication chip, antenna, and microcontroller chip on the circuit board.

FIGS. 14 and 15 show that the seal 110 may include raised or thickened sections 138A, B, which are positioned between respective actuators 134A, B and electrical switches 120, 122 to encourage effective transfer of force from the actuators to the switches. Also, the means of actuating the electrical switches 120, 122 is shown. The shift lever 37, and in particular the distal end 37B thereof, may be positioned closer to the outboard side 48 of the brake lever 36. The inboard side 53 of the brake lever 36 may include a spring holder 140 for the end of the actuator spring 136 opposite the button actuator 134A. When the shift lever 37 is urged toward the inboard side 53 the spring 136 is compressed between the holder 140 and the actuator 134A. The compression of the spring 136 causes the actuator 134A to press against the seal 110 and the thickened section 138A thereof depresses the dome switch element 128 of electrical switch 120. The actuation of electrical switch 120 sends a signal through associated circuitry as is well known to be acted upon by the controller 116 according to instructions provided thereto. It is believed that the presence of separate levers for brake and shift operations may be comfortable to bicycle operators who are used to mechanical shifting systems having separate levers for the brake and shift functions.

FIGS. 17-21 show elements included in the housing 32 of the control assembly. The housing 32 may be a one-piece construction or multi-piece construction formed by 3-D printing or injection molding, for example, of thermoplastic, composite materials, metals and alloys thereof or any suitable material. As a frame of reference, line B-B, shown in FIG. 4, can be considered a centerline of the control assembly 30, or parallel to a centerline, which centerline is also generally shown in FIG. 9 as a sectional view thereof. Turning back to FIG. 17, several features of the control assembly 30 are shown on the housing 32 and occupy a plane or orientation that is substantially aligned with the centerline.

For example, the power supply 130 may be generally oriented parallel to or along the centerline and disposed in the internal body compartment 57 of the housing 32. While power supplies may be any number of shapes, the "coin" shape is a commonly available shape and fits comfortably within the housing 32. The power supply 130 is positioned on a front side of a holder 142 that holds and electrically contacts the power supply. An optional accessory board 144 may be connected to the holder 142 in electrical communication therewith.

In another embodiment, the board 144 may carry most or all of the electronic componentry 106 except, for example, the electrical switch 120 and the antenna 114.

Figure 20:
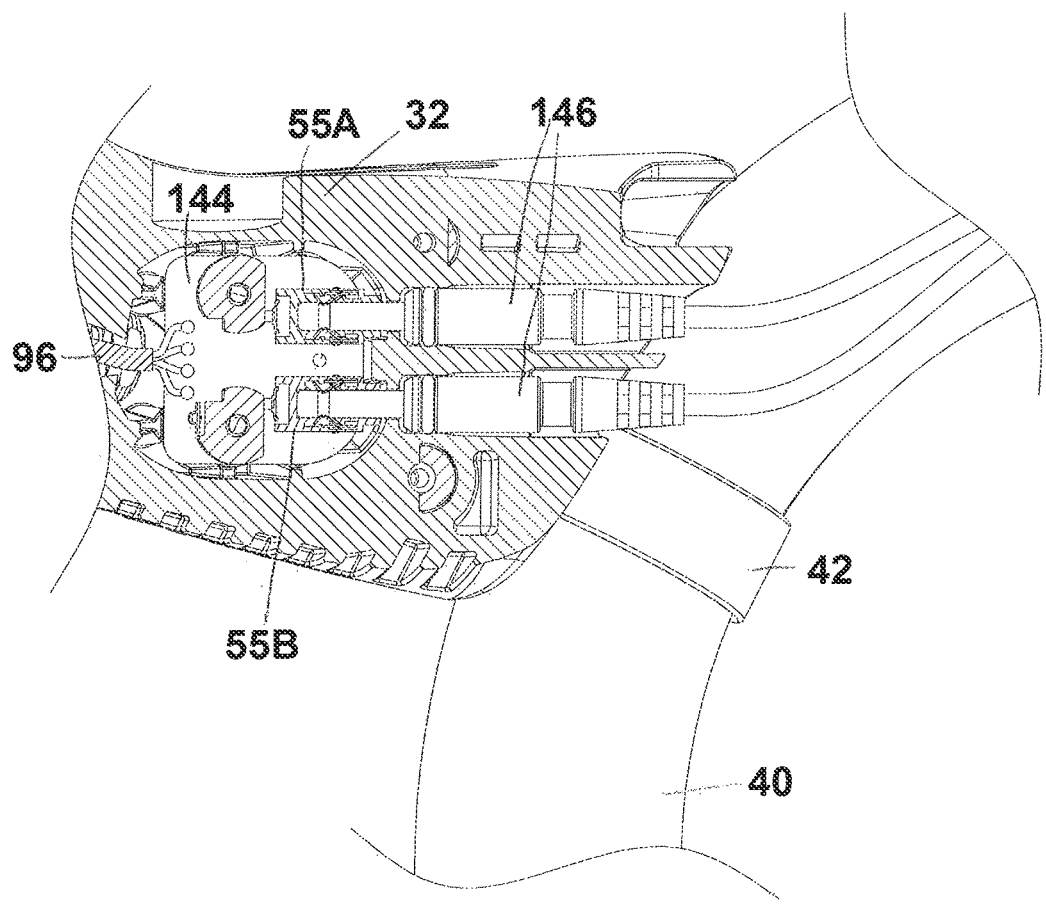
FIG. 20 is a sectional view along G-G of FIG. 4 of the auxiliary connections and auxiliary connectors.
Figure 21:
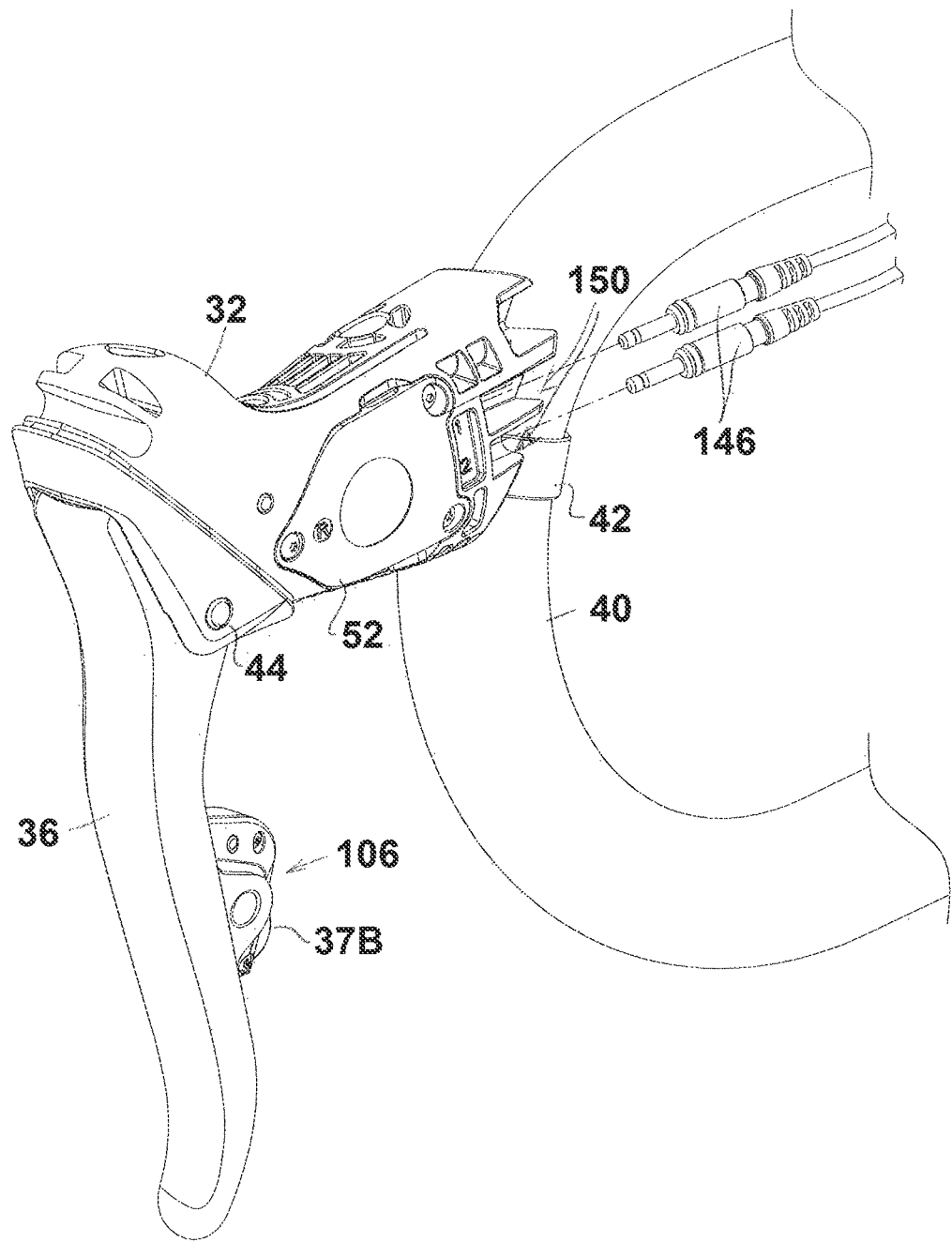
FIG. 21 is a perspective view of the control assembly with the cover removed and the auxiliary connectors installed in the shifter.

The accessory board 144 may include one or more accessory connections 55 to receive connectors 146 (see FIG. 20). The connectors 146 may be for connecting optional additional and/or remote electrical switches or other devices (not shown) to the assembly 30. When connectors 146 are not used, the accessory connections 55 may be closed and/or sealed from contamination by inserting plugs 148 into accessory ports 150, which includes bores formed in the housing 32 to permit access to the accessory connections 55. The accessory board 144 is electrically connected to the cable 96 to electrically connect the power supply 130 to the electronic components 106. The body compartment 57 is closed with a seal 152 and the access cover 52 is fastened to the housing 32 over the seal.

Figure 22A:
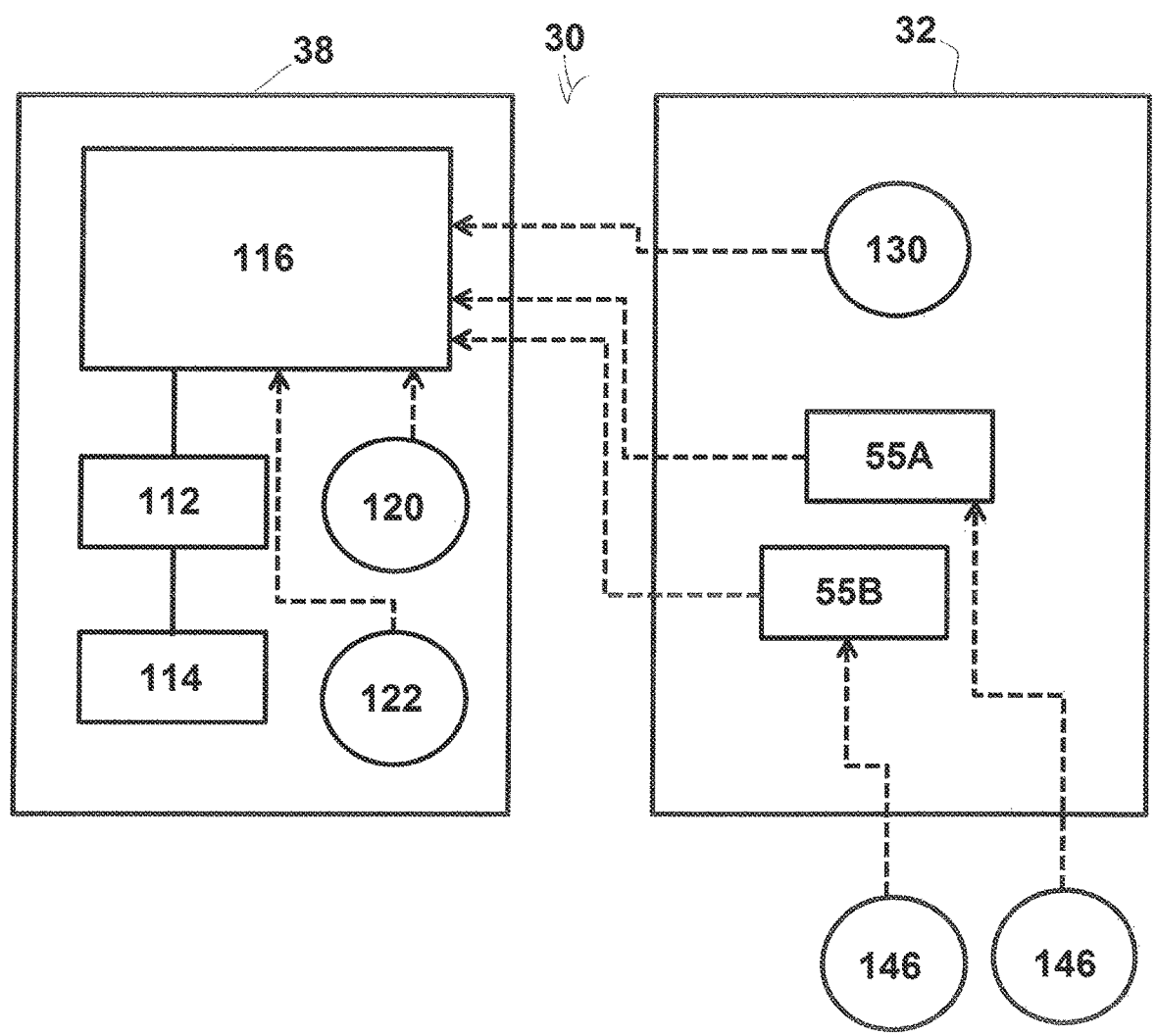
FIGS. 22A, 22B are embodiments showing distributions of elements directed to shifting structures of the invention.

FIG. 22A shows an embodiment of a single control assembly 30 in a schematic form. Generally, the control assembly 30 can be considered to include two main assemblies; one includes the housing 32 and accompanying elements and the other includes the first operating member, in one example a shift lever assembly 38, or in another example the brake lever 36, and accompanying elements.

The housing 32 may include one or more auxiliary or accessory 96 connection 55A, 55B, each of which may receive an auxiliary electrical switch or the like (not shown). The housing 32 also includes a power supply 130. The power supply 130 and accessory connections 55A, 55B are operatively connected to a controller 116 residing on the first operating member, e.g., the shift lever assembly 38.

The first operating member 36 or 38 includes the controller 116 and a communications module 112 connected to the controller 116. An antenna 114 is connected to the communications module 112. One or more electrical shift switch 120 is connected to the controller 116. A secondary electrical switch 122 is optional and may be connected to the controller 116.

Figure 22B:
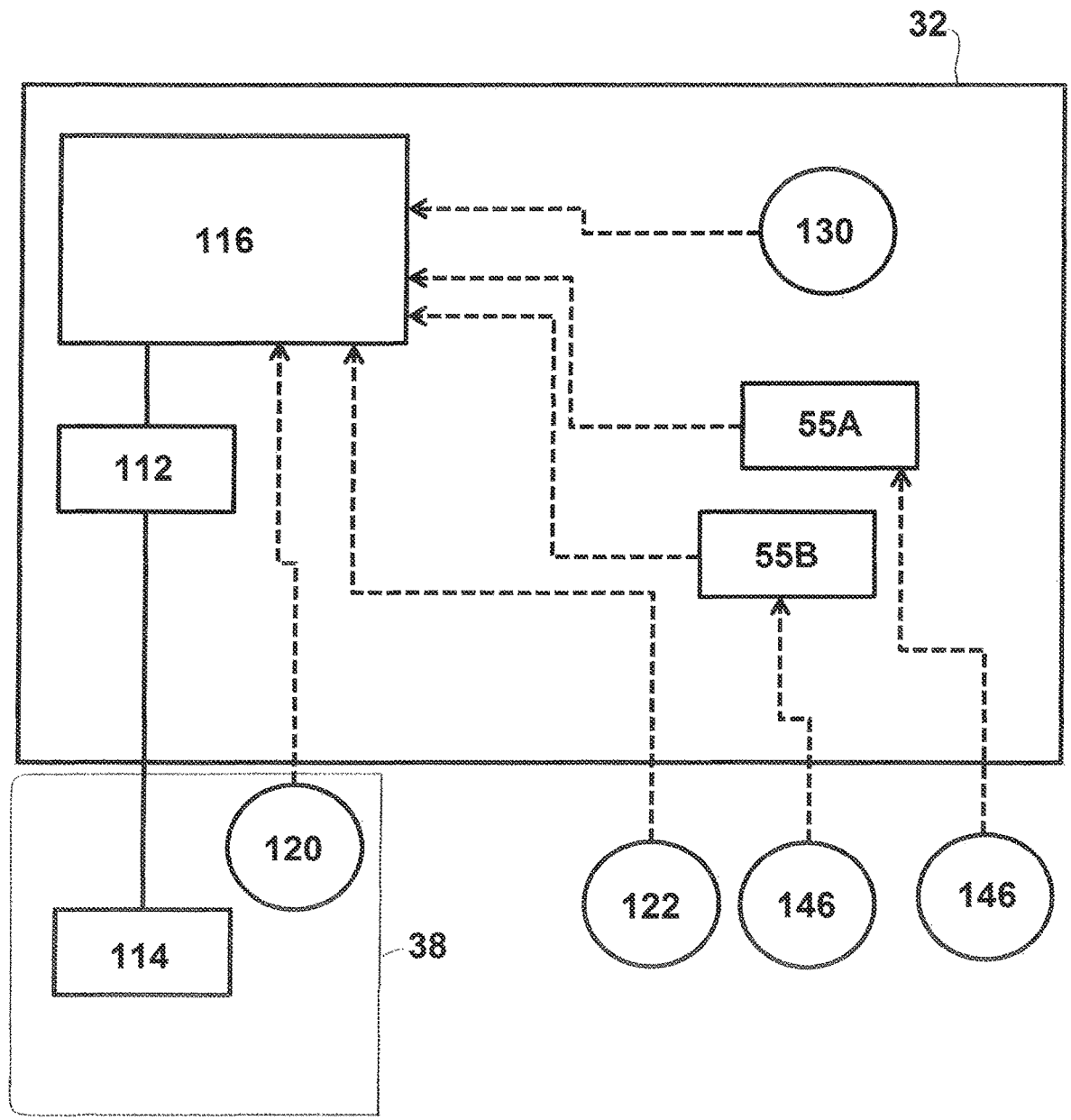

FIG. 22B shows an alternative embodiment of a single control assembly 30 in a schematic form. Generally, the control assembly 30 can be considered to include two main assemblies; one includes the housing 32 and accompanying elements and the other includes the first operating member, in one example a shift lever assembly 38, and accompanying elements.

The housing 32 may include one or more auxiliary or accessory connection 55A, 55B, each of which may receive an auxiliary electrical switch or the like (not shown). The housing 32 also includes a power supply 130. The power supply 130 and accessory connections 55A, 55B are operatively connected to a controller 116 and a communications module 112 connected to the controller 116 residing in or on the housing.

The shift lever assembly 38 includes the antenna 114 connected to the communications module 112. One or more electrical shift switch 120 is connected to the controller 116. A secondary electrical switch 122 is optional and may be connected to the controller 116. The secondary electrical switch 122 could be located on the housing 32 or the shift lever assembly 38. The first operating member may also be a brake lever 36.

Figure 23:
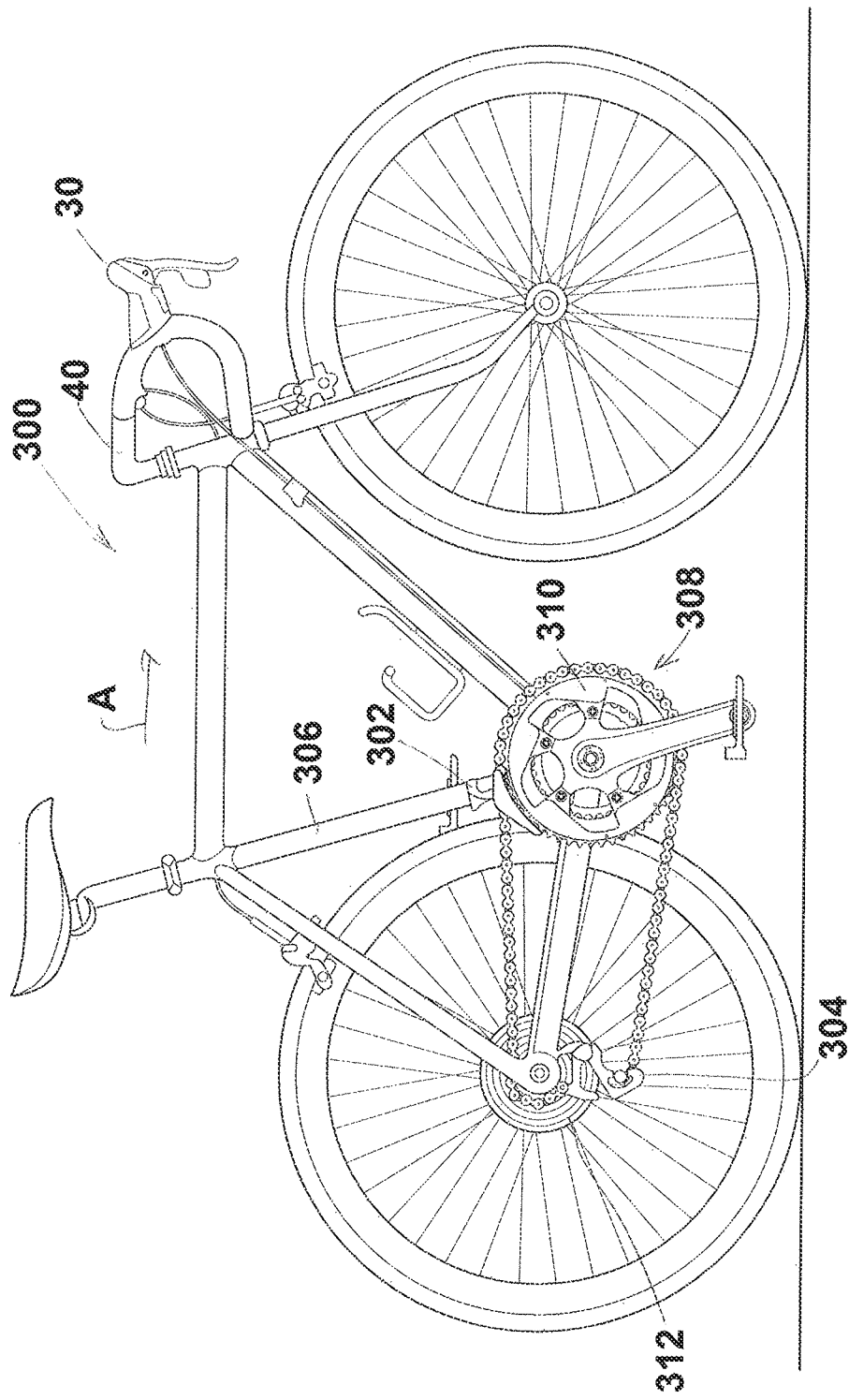
FIG. 23 is a side view of a bicycle including a control assembly according to the invention.

FIG. 23 is a bicycle 300 with a drop-bar type handlebar 40 shown with features of the invention. The bicycle 300 includes at least one control assembly 30 mounted to the handlebar 40, which is attached to the bicycle. The bicycle 300 may have one or both of a front gear changer 302 and a rear gear changer 304 mounted to the bicycle frame 306 part of the bicycle. The gear changers 302, 304 may be electromechanical derailleurs, for example. The bicycle 300 includes a multiple-geared drive train 308 with one or more chainrings 310 connected to a plurality of sprockets 312 by a chain 314 as is known in the art. The front and forward direction is indicated by the direction of arrow "A".

Figure 24:
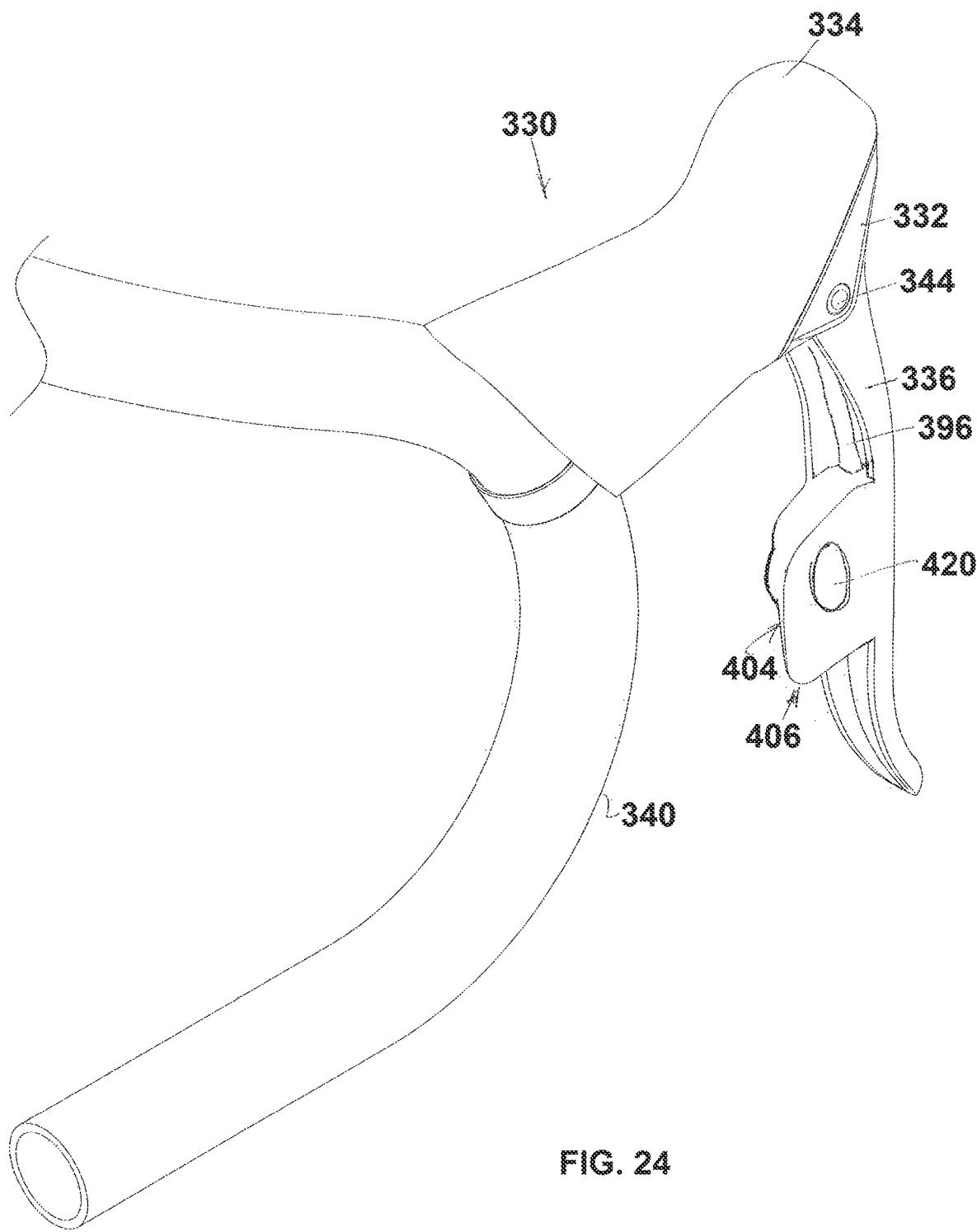
FIG. 24 is another embodiment of a control assembly for a bicycle.

FIG. 24 illustrates an embodiment of the invention wherein the brake and shift functions are operated on a single structure. A control assembly 330 is mountable to a handlebar 340 with a known type of clamp, as in the above embodiment. Typically, a bicycle will use a pair of control assemblies 330, one for each side of the handlebar, as is well known. It will also be understood that together, the pair of assemblies may be configured to operate a pair of electromechanical derailleurs. Similarly, the assemblies 330 may also be configured to operate brake devices.

Control assembly 330 includes a housing 332, which may be covered with a cover 334. The housing 332 is shaped and sized to be grasped by a hand of a user. The housing 332 and cover 334 serves as a grip or graspable portion. The housing 332 may be of any suitable material, for example, metal, plastic and/or composite materials. The cover 334 may be made of any suitable material, such as natural and/or synthetic elastomeric materials and may be designed to present a comfortable interface with the user and reduce the tendency to become detached or moved from its position on the housing 332. The cover 334 may be configured to be removably attached to and held in position on the housing 332 using known means.

A sole operating member 336 is pivotally or movably attached to the housing 332, for example, at or near the leading or front part of the housing such that the brake lever is spaced apart from the handlebar 340 and can pivot generally forward and backward. The operating member 336 may be made of any suitable material such as metal, plastic or composite materials. The operating member 336 may be attached to the housing 332 by way of a pivot 344, which may in the form of a pivot, pin, rod or shaft, for example.

Some or all of operating member 336 may be generally U-shaped or channel-shaped and electronic components 406 may be positioned completely or partially within the interior or channel of the U-shape.

The electronic components 406 comprise the same elements as detailed in the embodiment set out above, and may be mounted on the operating member 336 in a compartment 404 formed in the operating member. The electronic components 406 may be connected to other components in the housing 332 by way of an electric connection or cable 396. The operating member 336 is provided with an electrical switch 420 movable relative to the operating member to actuate the electronic components 406.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle control assembly for operating an electromechanical gear shifting device, comprising:
   a graspable housing mountable to the bicycle, the housing including an internal compartment;
   a shift member movably connected to the housing, the shift member including a distal portion and a proximal portion, the proximal portion movably supported by the housing; and
   a power supply disposed in the compartment,
   wherein the bicycle control assembly has a centerline and the power supply is oriented parallel to the centerline.

2. The bicycle control assembly of claim 1, further comprising:
   a housing cover configured to provide access to the internal compartment.

3. The bicycle control assembly of claim 1, further comprising:
   an electrical switch disposed on the shift member, wherein the electrical switch is disposed at the distal portion of the shift member.

4. The bicycle control assembly of claim 3, further comprising:
   a controller in communication with the electrical switch configured to generate a signal to change a shift position of the gear shifting device responsive to an input from the electrical switch; and
   an antenna on the shift member and in communication with the controller to send the signal.

5. The bicycle control assembly of claim 4, wherein the distal portion includes an internal compartment and the antenna is housed within the internal compartment of the distal portion.

6. The bicycle control assembly of claim 1, wherein the power supply is a coin shaped battery.

7. The bicycle control assembly of claim 1, wherein the power supply is positioned on a front side of a holder that holds and electrically contacts the power supply.

8. The bicycle control assembly of claim 1, wherein the housing is of a one-piece construction.

9. The bicycle control assembly of claim 8, wherein the housing is formed of an injection molded thermoplastic.

10. The bicycle control assembly of claim 1, further comprising:
    an electrical switch disposed on the shift member; and
    a cable that electrically connects the power supply with the electrical switch.

11. The bicycle control assembly of claim 10, wherein the cable extends along the interior of the shift member.

12. A bicycle control assembly for operating an electromechanical gear shifting device, comprising:
    a graspable housing mountable to the bicycle, the housing including an internal compartment, a top surface, a bottom surface, a first side surface and a second side surface;
    a shift member movably connected to the housing, the shift member including a distal portion and a proximal portion, the proximal portion movably supported by the housing;
    an electrical switch disposed on the shift member;
    a controller in communication with the electrical switch configured to generate a signal to change a shift position of the gear shifting device responsive to an input from the electrical switch;
    a power supply disposed in the compartment and providing power to the controller and the electrical switch; and
    a housing cover configured to provide access to the internal compartment, and the housing cover is attached to one of the first side surface and the second side surface of the housing.

13. The bicycle control assembly of claim 12, wherein the housing cover sits flush with the at least one first side surface or the second side surface of the housing.

14. The bicycle control assembly of claim 12, wherein the power supply is configured to be installed through the at least one first side surface or the at least one second side surface of the housing.

15. The bicycle control assembly of claim 12, wherein the controller is housed within the internal compartment.

16. The bicycle control assembly of claim 12, wherein the housing cover is held in place on the housing with fasteners.

* * * * *